United States Patent
Williams

(10) Patent No.: US 7,977,927 B2
(45) Date of Patent: Jul. 12, 2011

(54) STEP-UP DC/DC VOLTAGE CONVERTER WITH IMPROVED TRANSIENT CURRENT CAPABILITY

(75) Inventor: Richard K. Williams, Cupertino, CA (US)

(73) Assignee: Advanced Analogic Technologies, Inc., Santa Clara, CA (US)

( * ) Notice: Subject to any disclaimer, the term of this patent is extended or adjusted under 35 U.S.C. 154(b) by 532 days.

(21) Appl. No.: 12/221,174

(22) Filed: Jul. 31, 2008

(65) Prior Publication Data
US 2009/0102439 A1    Apr. 23, 2009

Related U.S. Application Data

(63) Continuation-in-part of application No. 11/890,818, filed on Aug. 8, 2007, now Pat. No. 7,782,027, and a continuation-in-part of application No. 11/890,956, filed on Aug. 8, 2007, now Pat. No. 7,786,712.

(51) Int. Cl.
*G05F 1/46* (2006.01)
(52) U.S. Cl. .................................................. 323/266
(58) Field of Classification Search .................. 323/222, 323/266, 282; 363/59, 60
See application file for complete search history.

(56) References Cited

U.S. PATENT DOCUMENTS

| | | | | |
|---|---|---|---|---|
| 4,743,835 A * | 5/1988 | Bosse et al. | | 323/266 |
| 7,560,915 B2 * | 7/2009 | Ito et al. | | 323/282 |
| 7,812,579 B2 * | 10/2010 | Williams | | 323/266 |
| 2005/0099164 A1 * | 5/2005 | Yang | | 323/266 |
| 2007/0091655 A1 | 4/2007 | Oyama et al. | | 363/59 |
| 2007/0273430 A1 | 11/2007 | Akashi et al. | | 327/536 |
| 2007/0285151 A1 | 12/2007 | Fujiwara | | 327/536 |
| 2008/0031023 A1 | 2/2008 | Kitagawa et al. | | 363/59 |
| 2008/0157732 A1 * | 7/2008 | Williams | | 323/266 |
| 2008/0157733 A1 | 7/2008 | Williams | | 323/266 |
| 2008/0158915 A1 * | 7/2008 | Williams | | 363/21.06 |
| 2009/0059630 A1 * | 3/2009 | Williams | | 363/60 |

\* cited by examiner

*Primary Examiner* — Jeffrey L Sterrett
(74) *Attorney, Agent, or Firm* — Patentability Associates

(57) ABSTRACT

A DC/DC voltage converter includes an inductive switching voltage regulator and a capacitive charge pump connected in series between the input and output terminals of the converter. The charge pump has a second input terminal connected to the input terminal of the converter. This reduces the series resistance in the current path by which charge is transferred from the capacitor in the charge pump to the output capacitor and thereby improves the ability of the converter to respond to rapid changes in current required by the load.

26 Claims, 20 Drawing Sheets

STEP-UP DC/DC VOLTAGE CONVERTER WITH IMPROVED TRANSIENT CURRENT CAPABILITY

CROSS-REFERENCE TO RELATED APPLICATIONS

This application is a continuation-in-part of application Ser. No. 11/890,818 now U.S. Pat. No. 7,782,027 and application Ser. No. 11/890,956, now U.S. Pat. No. 7,786,712 each of which was filed on Aug. 8, 2007, and is incorporated herein by reference in its entirety.

BACKGROUND OF THE INVENTION

This invention pertains to the design, operation and performance of switching power supplies for use in DC/DC conversion and voltage regulation, and to the semiconductor components used in such converters. Specifically, this invention focuses on step-up DC/DC conversion, i.e. where the output voltage exceeds the input voltage, and especially on DC/DC conversion wherein the output voltage is significantly greater than the minimum input voltage.

Voltage regulation is commonly required to prevent variation in the supply voltage powering various microelectronic components such as digital ICs, semiconductor memories, display modules, hard disk drives, radio frequency (RF) circuitry, microprocessors, digital signal processors and analog ICs, especially in battery powered applications such as cell phones, notebook computers and consumer products.

Since the battery or other DC input voltage of a product often must be stepped-up to a higher DC voltage, or stepped-down to a lower DC voltage, such regulators are referred to as DC-to-DC converters. Step-down converters are used whenever the battery voltage is greater than the desired load voltage. Step-down converters may comprise inductive switching regulators, capacitive charge pumps, and linear regulators. Conversely, step-up converters, commonly referred to boost converters, are needed whenever the battery voltage is lower than the desired load voltage. Step-up converters may comprise inductive switching regulators or capacitive charge pumps.

Prior art inductive switching regulators, capacitive charge-pump converters, and linear regulators, however, all suffer from certain limitations in capability and performance.

Inductive Boost Switching Converters

Of the aforementioned voltage regulators, inductive switching converters can achieve superior performance over the widest range of currents, input voltages and output voltages. There are two major types of inductive switching converters—those utilizing single-winding inductors, typically referred to as non-isolated converters, and those using transformers and multiple winding inductors, typically referred to as isolated converters. Of these, single-winding, non-isolated inductive switching converters are typically used in portable products where size, efficiency, and battery life are paramount.

Non-isolated inductive switching converters are capable of operating at high efficiency over a wide range of input and output voltages and load currents, particularly when dedicated to only stepping up or stepping down an input to a higher or lower voltage respectively. Non-isolated step-down converters are commonly referred to as Buck converters. Non-isolated step-up converters are frequently referred to as boost converters. Non-isolated inductive switching regulators are described in application Ser. No. 11/890,818, entitled "High-Efficiency DC/DC Voltage Converter Including Down Inductive Switching Pre-Regulator and Capacitive Switching Post-Converter" by R. K. Williams, incorporated herein by reference.

Inductive switching regulators suffer from a variety or fundamental limitations. Both Buck and boost converters, for example, exhibit difficulties with extremely narrow pulse widths. Narrow pulses naturally occur at high conversion ratios, i.e. when the output voltage is dramatically different than the input voltage. Narrow pulses also occur when the output and input voltages are similar.

For example, in a boost converter, narrow pulse widths occur whenever the desired output voltage is significantly greater the input voltage. This narrow pulse limitation makes it difficult and inefficient to step an input voltage up by a high ratio—for example, by a factor of four or more. This occurs because, in fixed frequency operation, a boost converter delivers an output voltage according to the relation:

$$V_{OUT} = \frac{1}{1-D} V_{batt}$$

where $V_{batt}$ is the input and D is the duty factor of the MOSFET conducting during magnetizing of the inductor, i.e. during magnetic energy storage. For $V_{OUT} \gg V_{batt}$, then the expression (1−D) must be small, so that D→100%. As D increases, the low side MOSFET is on for an increasing portion of the period, and less time is available to transfer its energy to the output capacitor. Transferring more energy in a shorter duration requires increasingly higher currents, and efficiency suffers.

Because the low side MOSFET must turn off and then turn back on very quickly, extremely high duty cycles in a boost converter create a narrow off pulse problem, and degrade efficiency for high step up conversion ratios. Ideally, the converter should operate closer to a 50% duty cycle, so a more equal amount of time is made available for both magnetizing the inductor, and then transferring the energy stored in the inductor to the output capacitor.

Narrow pulse widths can also occur when the regulator's input and output voltages are similar, i.e. when the output-to-input voltage transfer ratio approaches unity. This condition manifests itself not as current spikes, but as a phenomenon called "dropout" where regulation is degraded.

Dropout in Prior Art Converters

Regardless of whether the converter is a step-up or step-down converter, prior art converters suffer from a problem referred to as dropout. Specifically, whenever the input voltage and the output voltage approach one another within the range of several hundred millivolts, i.e. $V_{out} \approx V_{in} \pm 200$ mV, the regulating ability of the converter suffers. Loss of regulating ability may be manifested in several ways, either by a one-time or repeated glitch or discontinuity in the output voltage, by an increased ripple in the output voltage, or by a complete loss of regulation within some narrow voltage band. In these situations, the converter "drops out" of regulation.

In a boost converter near dropout, as D→0%, the duty factor must jump from $D_{min}$ to 0% whenever the time duration becomes too short to achieve closed loop control. At a zero duty factor, no energy is being transferred from the input terminal of the converter into the inductor, so control and therefore regulation, are momentarily lost. Similarly, a Buck converter momentarily loses regulation as its switching duty factor jumps from $D_{max}$ to 100%, and it completely loses regulation while D=100%, since the input terminal is essentially resistively connected to the output terminal. So both Buck and boost configured inductive switching regulators suffer dropout near unity conversion ratios.

Another type of step-down converter, the linear regulator also suffers dropout and loss of regulation whenever the ΔV across the linear regulator's input and output terminals becomes too small. In essence, dropout occurs in a linear regulator because the loop gain of the amplifier performing regulation drops precipitously as its transistor pass element changes from behaving as a current source into behaving as a variable resistor. If the pass element is a bipolar transistor, the loss of gain occurs at small values of $V_{CE}$ as the device transitions from its active operating region into saturation. In many bipolar linear regulators, this dropout condition occurs at more than 400 mV.

In so-called "low dropout" linear regulators or "LDOs", a MOSFET capable of operating as a current source at a lower ΔV is substituted for the bipolar pass element, but the linear regulator still drops out at a ΔV of 200 to 300 mV as the power MOSFET pass element transitions from its saturation, i.e. constant current, region into its linear, i.e. resistive, region of operation. So while linear regulators are not switching and are not limited by the narrow pulse problem, they still suffer from dropout effects and a corresponding loss of regulation. Moreover, by itself, the linear regulator is only capable of step down operation.

Compared to their non-isolated counterparts, isolated converters such as the flyback and forward converter are able to operate at high efficiencies near unity conversion without the need switching modes or suffering dropout, but their use of physically-large tapped inductors, coupled inductors, and transformers precludes their application in most portable products.

Charge Pump Converters

An alternative to a switched-inductor converter is a charge pump, a voltage conversion circuit using only switches and capacitors to perform voltage translation through repeated charge redistribution, i.e. the continuous charging and discharging of a capacitor network driven by a clock or oscillator. While a large variety of prior-art charge pumps exist, utilizing any number of flying capacitors and MOSFET switching networks, this type of converter can be pre-configured to either step-up or step-down a voltage but cannot be pre-configured to do both step-up and step-down conversion.

The two most common topologies of step-up charge pumps are the charge pump doubler and the 1.5× fractional charge pump. The charge pump doubler 1 of FIG. 1A, for example, comprises a battery or voltage source 2 of voltage $V_{batt}$, a flying capacitor 3, MOSFETs 4, 5, 6 and 7, and output capacitor 8. The operation of doubler 1 involves successively and repeatedly charging flying capacitor 3 in current path ● and then transferring charge from the flying capacitor to output capacitor 8 in current path ●. Charging of flying capacitor 3 occurs by turning on MOSFETs 4 and 5 while MOSFETs 6 and 7 remain off, so that after some time $V_{fly} \approx V_{batt}$, as illustrated in the equivalent circuit 10 shown in FIG. 1B. As illustrated, voltage source 11 represents battery 2.

Transferring charge from capacitor 3 to output capacitor 8 occurs by turning on MOSFETs 6 and 7 while turning off MOSFETs 4 and 5. The equivalent circuit 15, shown in FIG. 1C, illustrates that during the charging of output capacitor 8, flying capacitor 3 electrically sits atop battery 11 so that there voltages add. Since $V_{fly} \approx V_{batt}$ then capacitor 8 charges to a voltage approximately double that of $V_{batt}$, i.e. the output voltage $V_{OUT}$ approaches $2V_{batt}$. For this reason, charge pump 1 is often referred to as a doubler. Provided battery 11 has minimal internal series resistance (not schematically), charge transfer current ● can be substantial, allowing the doubler charge pump 1 to react quickly to changing load conditions and maintain the output voltage while delivering added current to an electrical load.

In some applications producing an output double the input voltage may be excessively high for the electrical load being powered. In such an event, the efficiency of charge pump 1 can be very low. One way to improve overall charge pump efficiency is to employ a fractional charge pump 20 as shown in FIG. 2A.

As illustrated, 1.5× charge pump 20 comprises a battery or voltage source 21 of voltage $V_{batt}$, two flying capacitors 22 and 23, MOSFETs 24, 25, and 26 for charging the flying capacitors 22 and 23, MOSFETs 27, 28, 29 and 30 for transferring charge to the output terminal, and output capacitor 31. Fractional operation involves successively and repeatedly charging flying capacitors 22 and 23 in series through current path ● and then transferring charge from the flying capacitor connected in parallel to output capacitor 31 through current path ●. Specifically, charging of flying capacitors 22 and 23 occurs by turning on MOSFETs 24, 25 and 26 while MOSFETs 27, 28, 29 and 30 remain off. Because capacitors 22 and 23 are series connected, each of flying capacitors 22 and 23 charges to one-half the input voltage, i.e., $V_{fly} \approx V_{batt}/2$. The charging condition is illustrated by equivalent circuit 10 shown in FIG. 2B, where voltage source 36 represents battery 21 without any significant internal series resistance.

Transferring charge from capacitors 22 and 23 to output capacitor 31 occurs by turning on MOSFETs 27, 28, 29 and 30 while turning off MOSFETs 24, 25, and 26. The equivalent circuit 40, shown in FIG. 2C, illustrates that during the charging of output capacitor 31, flying capacitors 22 and 23 are connected in parallel, with the parallel combination sitting electrically atop battery 36 so that there voltages add. Since $V_{fly1} = V_{fly2} \approx V_{batt}/2$, capacitor 31 charges to a voltage approximately one and a half times that of $V_{batt}$, i.e. output voltage $V_{OUT}$ approaches $1.5V_{batt}$. For this reason, charge pump 40 is often referred to as a fractional step-up charge pump. Provided battery 36 has minimal internal series resistance (not shown schematically), charge transfer current ● can be substantial, allowing the fractional charge pump 40 to react quickly to changing load conditions and maintain the output voltage while delivering added current to an electrical load.

The advantage of the charge pumps shown in FIGS. 1A and 2A is that at specific voltage conversion ratios, the charge pump can exhibit conversion efficiencies approaching 100%. The high efficiency occurs because very little current flows in each charging and discharging cycle.

One disadvantage of a charge pump is that it can only efficiently operate at specific conversion ratios. If the output voltage is other than a select multiple of the input voltage, the converter exhibits a low efficiency. If for any reason, e.g. loading of the output, $V_{out}$ deviates from the target voltage of $2V_{batt}$ in a doubler or $1.5V_{batt}$ in a fractional charge pump, then the efficiency of the converter drops.

Since the efficiency of the charge pump converter drops whenever the output-to-input voltage conversion ratio deviates from these specific voltage conversion ratios, it is not capable of generating a predetermined output voltage without significantly sacrificing efficiency.

Charge pumps therefore operate efficiently only when their output voltage is some fixed fractional multiple of their input voltage. If a charge pump's output voltage changes in proportion to its input voltage, it cannot be considered as a voltage regulator. Adapting a charge pump to produce a fixed output voltage as the input voltage varies, e.g. by forcing the output of the charge pump to a lower voltage by partially charging the flying capacitors, invariably sacrifices efficiency. For that reason, charge pumps do not make efficient voltage regulators.

Limitations of Prior-Art Up-Down Converters

In conclusion, prior art DC-to-DC converters and voltage regulators suffer from a number of limitations as summarized in the following table.

| Feature | Buck | Linear Reg | Boost | Charge Pump |
| --- | --- | --- | --- | --- |
| Step Up/Down | Down Only | Down Only | Up Only | Up or Down, Predetermined |
| Efficiency | Superior | Depends on voltage ratio | Good | Depends on voltage ratio |
| Regulation, Nominal Oper | Excellent | Excellent | Excellent | None |
| Operation at $V_{in} \approx V_{out}$ | Loses Regulation | Loses Regulation | Loses Regulation | Low Efficiency |
| Operation at $V_{in} \ll V_{out}$ | No operation | No operation | Limited by $I_L$ & pulse width | Limited by efficiency |

Of the available prior art converters, Buck converters and linear regulators can only offer step down conversion. Furthermore, they lose regulation, i.e. suffer dropout, whenever the input and output voltages are similar. For large differences in input and output voltages, linear regulators also suffer from poor efficiencies.

The boost converter is able to step-up an input voltage but with a number of limitations.

In addition to suffering dropout when $V_{in} \approx V_{out}$ and the duty factor approaches 100% due to the narrow pulse problem, the inductive boost converter is also limited whenever the duty factor approaches zero. At such a condition, a boost converter's ability to step up an input voltage by a large multiple is limited from extremely narrow pulses of high currents, degrading efficiency and limiting its ability to regulate against transients.

Charge pumps, also capable of step-up conversion, can offer good efficiency at higher conversion ratios, e.g. at 2× or 3× the input, but only at exact predetermined voltage multiples. They are not practical for general voltage regulation. Any deviation from a predetermined multiple results in significant loss of efficiency.

In short, all present day non-isolated converters are limited in performance whenever their output and input voltages differ greatly. Except for charge pumps, which do not provide an efficient means of regulation, the prior-art DC-to-DC converters may also become unstable or lose regulation when $V_{in} \approx V_{out}$, i.e. approaching unity conversion ratios.

The choices for step-up conversion are even more limited since only boost converters or charge pumps provide non-isolated step up conversion in a small space. Boost converters, however, suffer from high MOSFET currents and low efficiency at high conversion ratios. Charge pumps cannot provide regulation without sacrificing efficiency.

What is needed is a step-up converter and voltage regulator that is efficient over a wide-range of input and output voltages and capable of high conversion ratios without operating at extremes in duty cycle, thereby avoiding the aforementioned narrow pulse problems. Ideally such a converter should also be able to minimize problems associated with dropout approaching unity voltage transfer conversion ratios. Moreover, the converter should be able to supply high transient current while sustaining tight regulation.

BRIEF SUMMARY OF THE INVENTION

In a DC/DC voltage converter according to the invention, an output terminal of a pre-regulator comprising an inductive switching voltage converter is connected to an input terminal of a post-converter comprising a charge pump. The pre-regulator may comprise either a step-down (Buck) or step-up (boost) converter. The post-converter may comprise either an integral or fractional charge pump. The input terminal of the pre-regulator is the input terminal of the DC/DC voltage converter; the output terminal of the post-converter is the output terminal of the DC/DC voltage converter.

In accordance with the invention, the post-converter has a second input terminal which is coupled to the input terminal of the DC/DC converter. The second input terminal of the post-converter is coupled through a switch to a terminal of a capacitor within the charge pump. In operation, the switch is repeatedly opened and closed such that the terminal of the capacitor is sequentially connected to and disconnected from the input terminal of the DC/DC voltage converter. This is in contrast to the structure described in application Ser. Nos. 11/890,818 and 11/890,956, wherein the terminal of the capacitor in the charge pump is coupled through a switch to the output terminal of the pre-regulator.

As a result, as the terminal of the capacitor in the charge pump is repeatedly connected to the input terminal of the DC/DC voltage converter, the voltage across the capacitor is added to the in put DC voltage rather than the intermediate voltage produced by the pre-regulator. The pre-regulator and post-converter may be driven by a common clock pulse generator, and the charge transfer from the capacitor in the charge pump to the output capacitor may occur either in phase or out of phase with the magnetizing of the inductor in the pre-regulator.

A DC/DC converter of this invention is able to supply relatively large transient currents in response to the demands of the load because the transient current capability of the converter is not affected by the series resistance of the pre-regulator.

DETAILED DESCRIPTION OF THE INVENTION

A new family of high-efficiency DC-to-DC converters and switching regulators is disclosed in Applications Nos. 11/890,818, 11/890,941, 11/890,956, and 11/890,994, all of which were filed on Aug. 8, 2007, and all of which are incorporated herein by reference. These converters feature the capability of dynamic up-down conversion and large voltage conversion ratios without the complication of mode switching, instability, over a wide range of operating conditions.

The converters disclosed therein combine an inductive energy storage element, denoted by L, with one or more continuously-switched capacitive storage elements, denoted by C. In one embodiment, referred to herein as a class of LCXU converter, a two-stage voltage converter comprises an inductive switching pre-regulator followed by a capacitive voltage post-converter. The inductive pre-regulator may either step-up or step-down the input voltage. The capacitive post-converter steps up the voltage at its input terminal, which is the output voltage of the pre-regulator.

In a preferred embodiment, the entire two-stage converter uses synchronized switching of the inductor and the capacitors, and employs closed loop feedback from the post-converter's output terminal to modulate the pulse width of the inductive pre-regulator.

One implementation, the so called LCUU topology combines a step-up inductive pre-regulator with a step-up post-converter. The LCUU topology provides step-up voltage conversion with high conversion ratios at reasonable duty factors, i.e. where $V_{in} \ll V_{out}$, avoiding the aforementioned narrow pulse problem of prior-art switching regulators. In similar fashion, a LCDU topology combines a step-down inductive pre-regulator with a step-up post-converter.

Other LCXX and a related class of CLXX converters are described in the aforementioned patent disclosures. This disclosure, however, relates specifically to a variant of the LCXU class of converters, comprising a step-up or step-down inductive pre-regulator followed by a step-up capacitive post converter.

LCXU Converter Operation

Figure 1A:
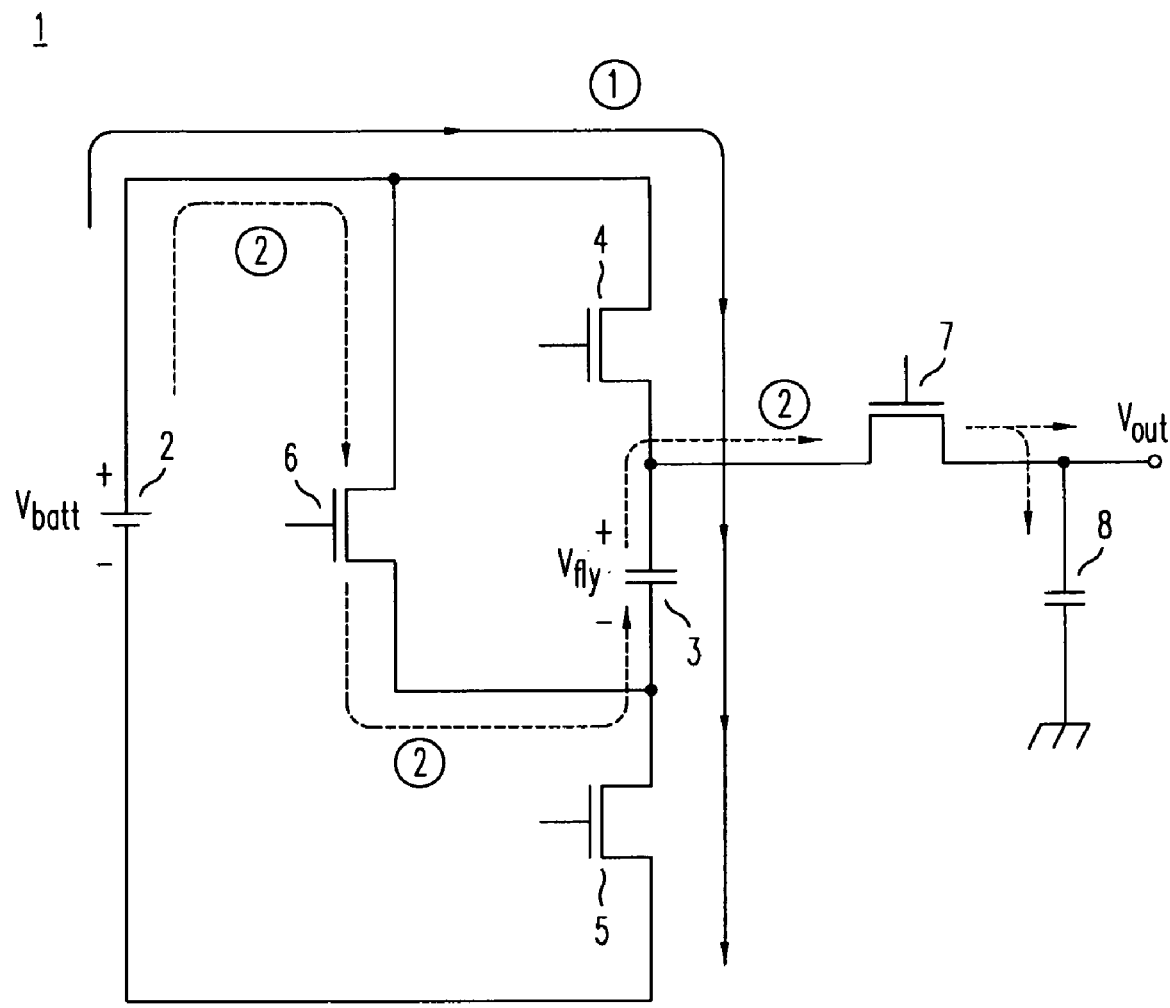
FIG. 1A is a circuit diagram of a charge pump doubler.
Figure 1B:
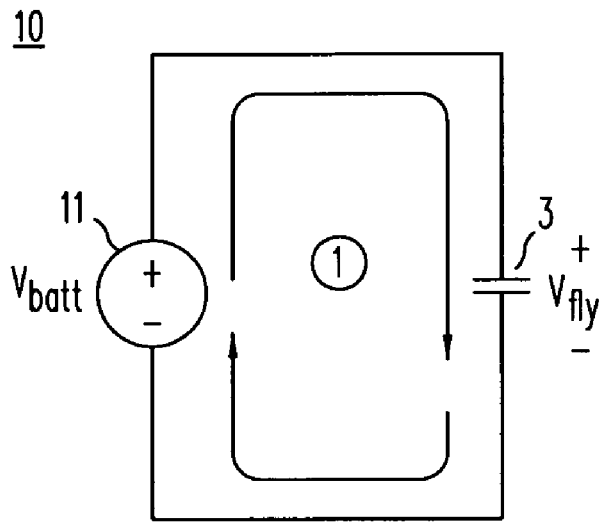
FIGS. 1B and 1C are equivalent circuit diagrams of the charge pump doubler during the charging and charge transfer phases, respectively.
Figure 1C:
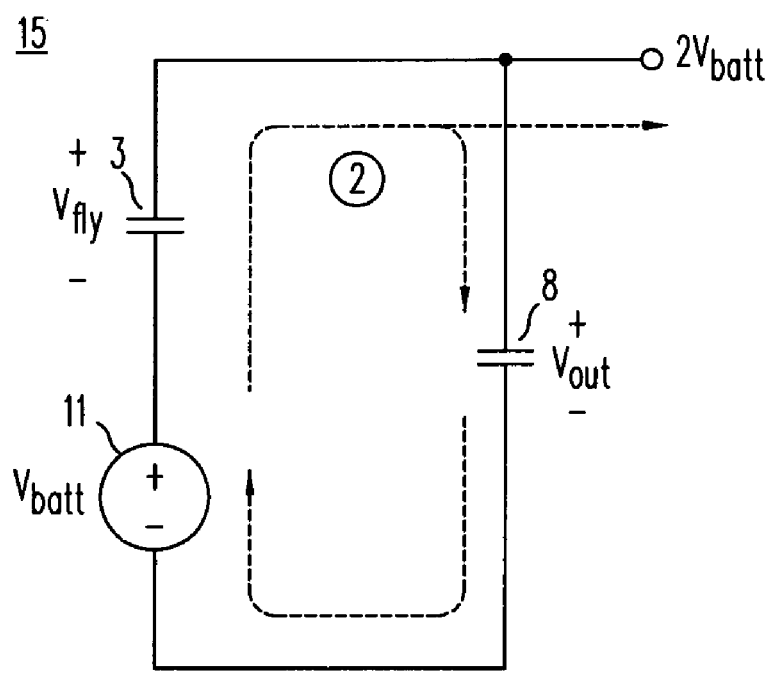
Figure 2A:
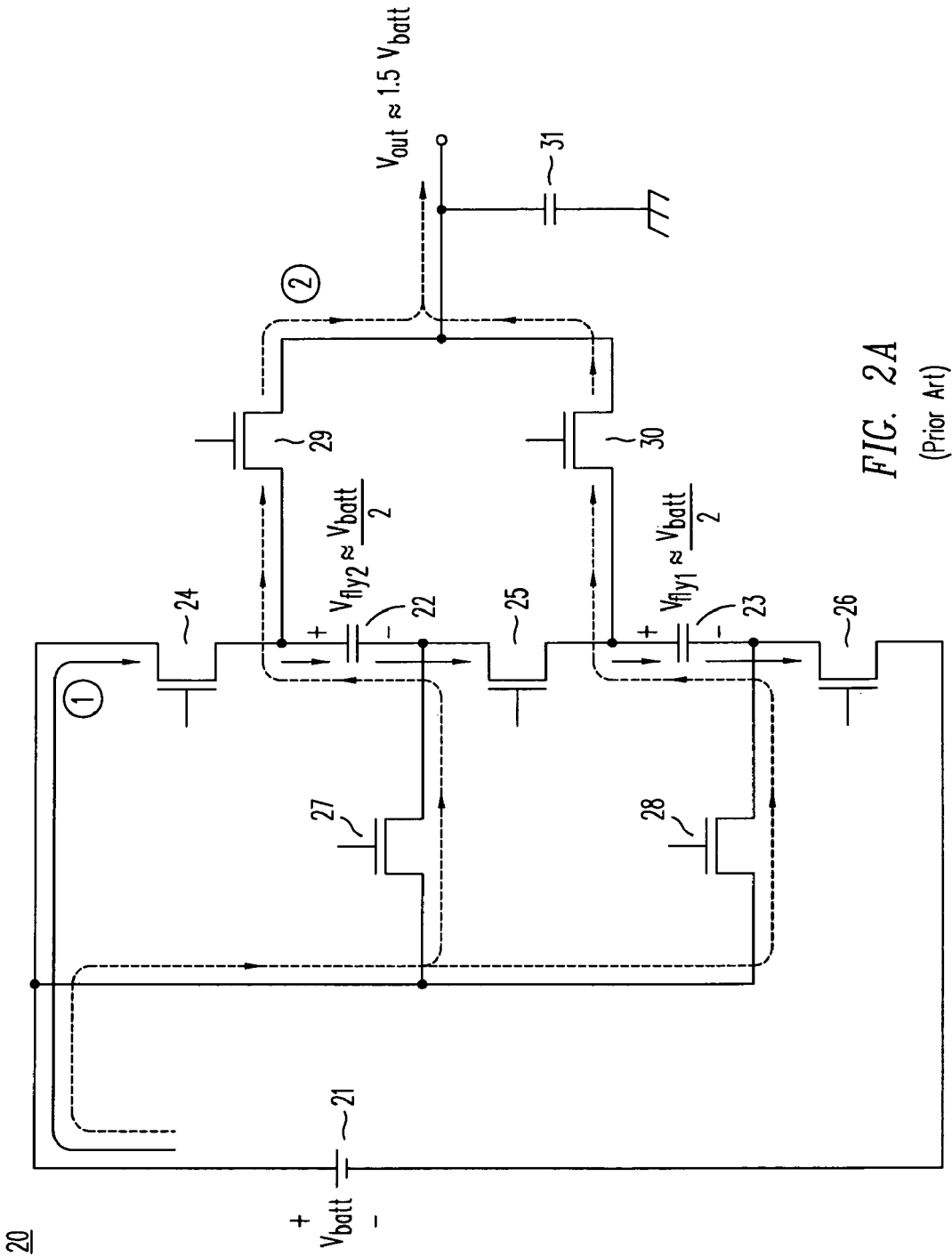
FIG. 2A is a circuit diagram of a fractional 1.5× charge pump.
Figure 2B:
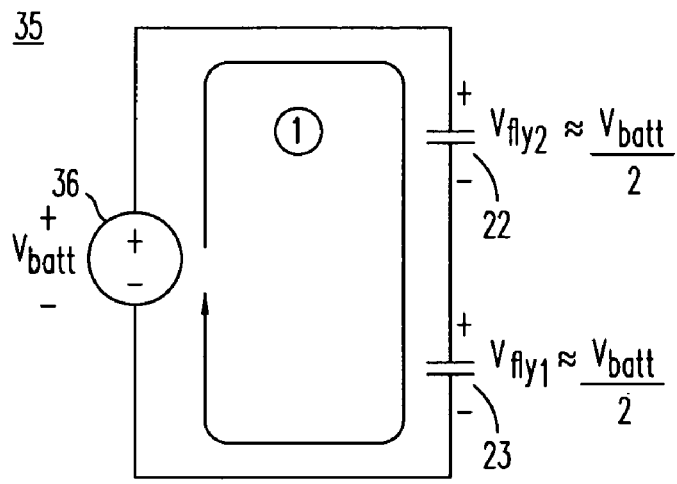
FIGS. 2B and 2C are equivalent circuit diagrams of the fractional 1.5× charge pump during the charging and charge transfer phases, respectively.
Figure 2C:
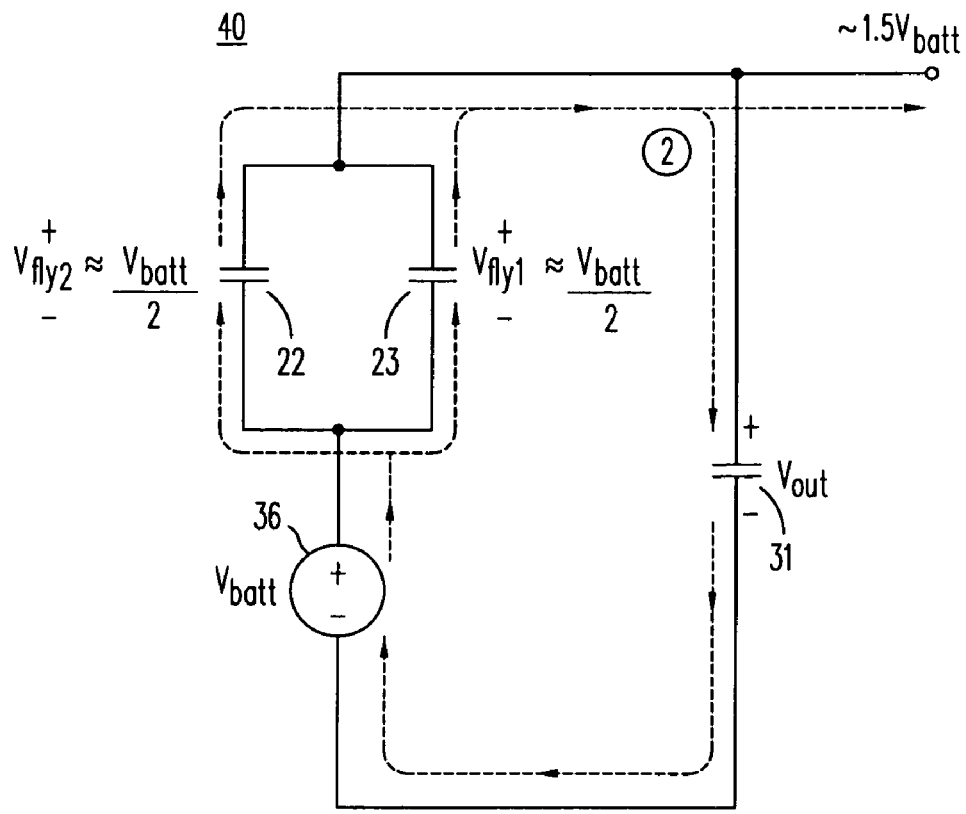
Figure 3A:
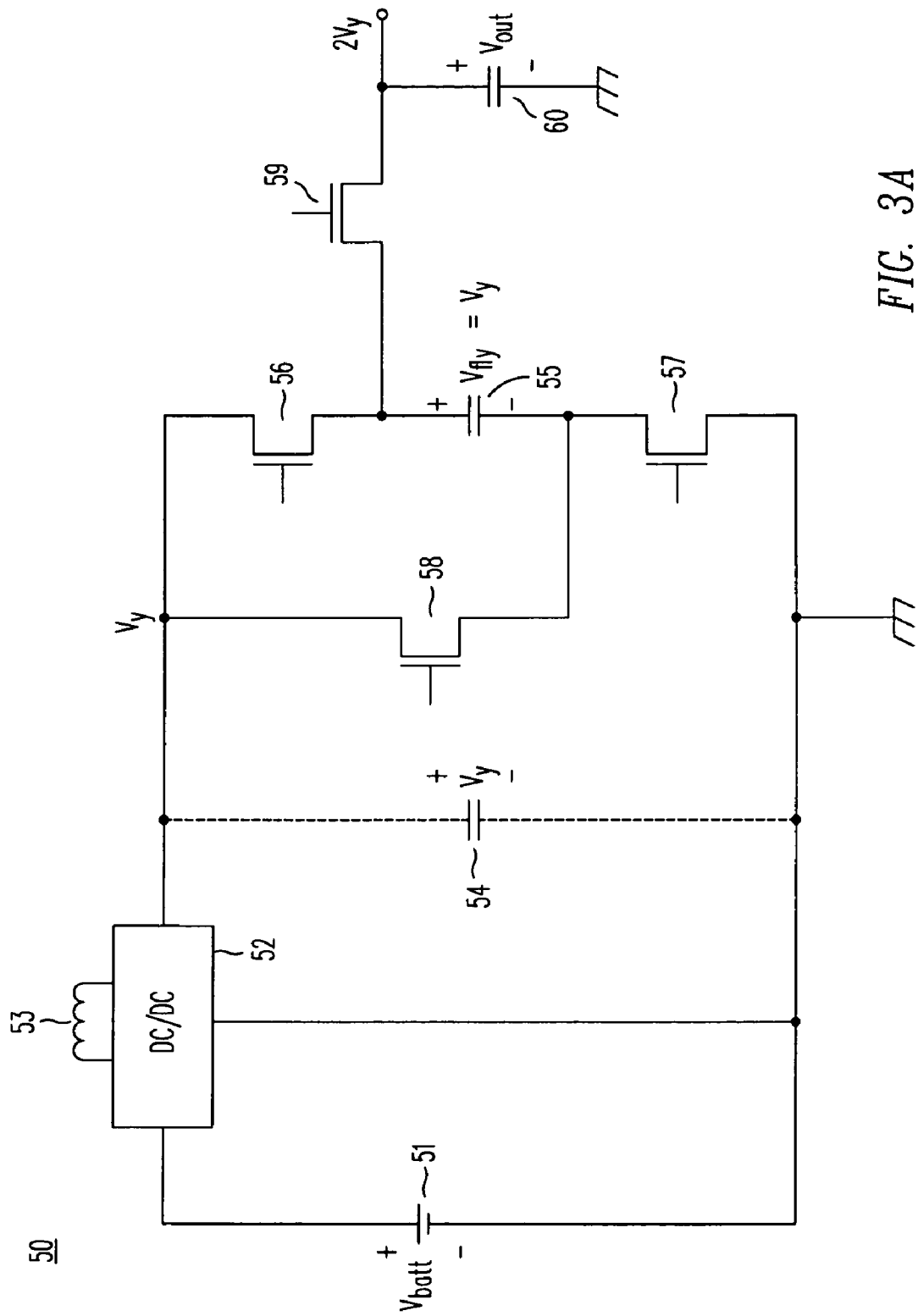
FIG. 3A is a circuit diagram of an LCXU converter with a 2× post-converter.

In the family of LCXU converters disclosed in application Nos. 11/890,818 and 11/890,956, the general topology can be represented by converter 50 shown in FIG. 3A comprising a battery or power source 51, a switching voltage pre-regulator 50A with inductor 53, and an intermediate reservoir capacitor 54 charged to an intermediate voltage $V_y$. Depending on the connections of inductor 53, pre-regulator 50A may comprise either a step-up or a step-down converter The output voltage $V_y$ of converter 50A powers a charge pump 50B, using a doubler topology comprising a single flying capacitor 55, a network of power MOSFETs 56, 57, 58 and 59 and an output capacitor 60. Output capacitor 60 is connected in parallel with a load 61. The control circuit for MOSFETs 56, 57, 58 and 59 (not shown) charges capacitor 55 by turning on MOSFETs 56 and 57 while MOSFETs 58 and 59 remain off, and then transfers the charge from capacitor 55 to capacitor 60 by turning on MOSFETs 58 and 59 while MOSFETs 56 and 57 are turned off.

Figure 3B:
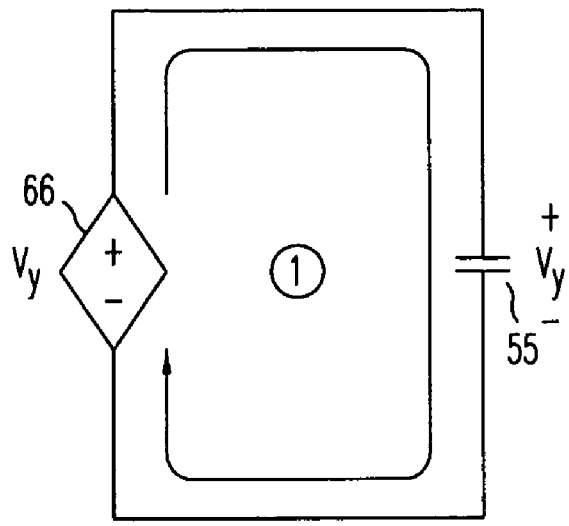
FIGS. 3B and 3C are equivalent circuit diagrams of the LCXU converter of FIG. 3A during the charging and charge transfer phases, respectively.

The operating principle of converter 50 can be illustrated by representing the charging of flying capacitor 55 to a voltage $V_y$ as equivalent circuit 65 in FIG. 3B where dependent voltage source 66 represents the output voltage $V_y$ of pre-regulator 50A at charged capacitor 54. During charging, a transient current ❶ flows until capacitor 55 reaches its final voltage $V_y$.

Figure 3C:
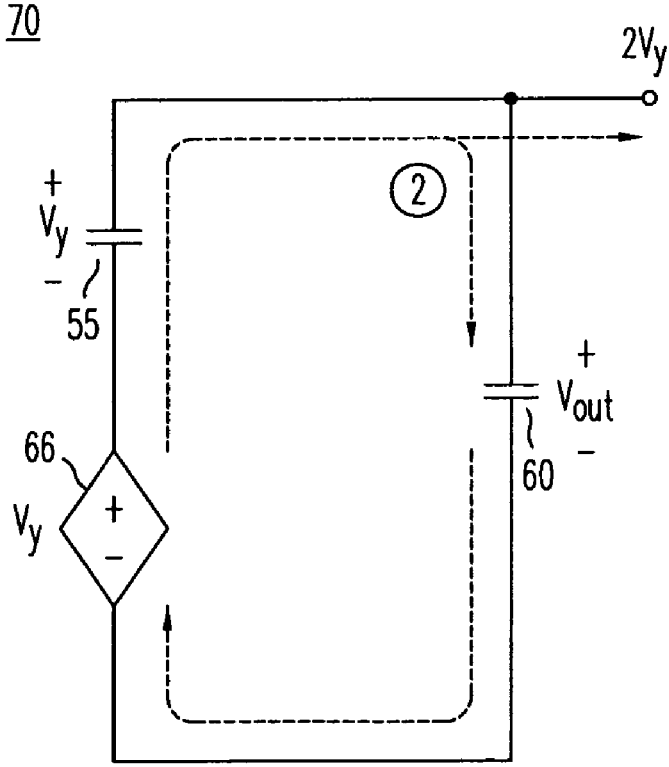

During the charge transfer cycle, shown by equivalent circuit 70 in FIG. 3C, the charged flying capacitor 55, charged to the voltage $V_y$, is electrically "stacked atop dependent voltage source 66 (the output voltage of pre-regulator 50A), which is also charged to a voltage $V_y$. Since the negative terminal of capacitor 55 is connected to the positive terminal of voltage source 66, the voltages add. Capacitor 60 is then charged to a voltage $2V_y$, twice the output of pre-regulator 50A. Since the output voltage of post-converter 50B is double the intermediate voltage $V_y$, the post converter 50B acts as a doubler.

A transient current ❷ flows to the transfer charge to capacitor 60 and to provide any current needed by the electrical load 61 connected in parallel to capacitor 60. The series impedance of this loop affecting current ❷ includes any parasitic resistance included within controlled voltage source 66. In other words the transient current capability of converter 50 is affected by the design of pre-regulator 50A and the capacitance and type of capacitor 54.

Figure 4A:
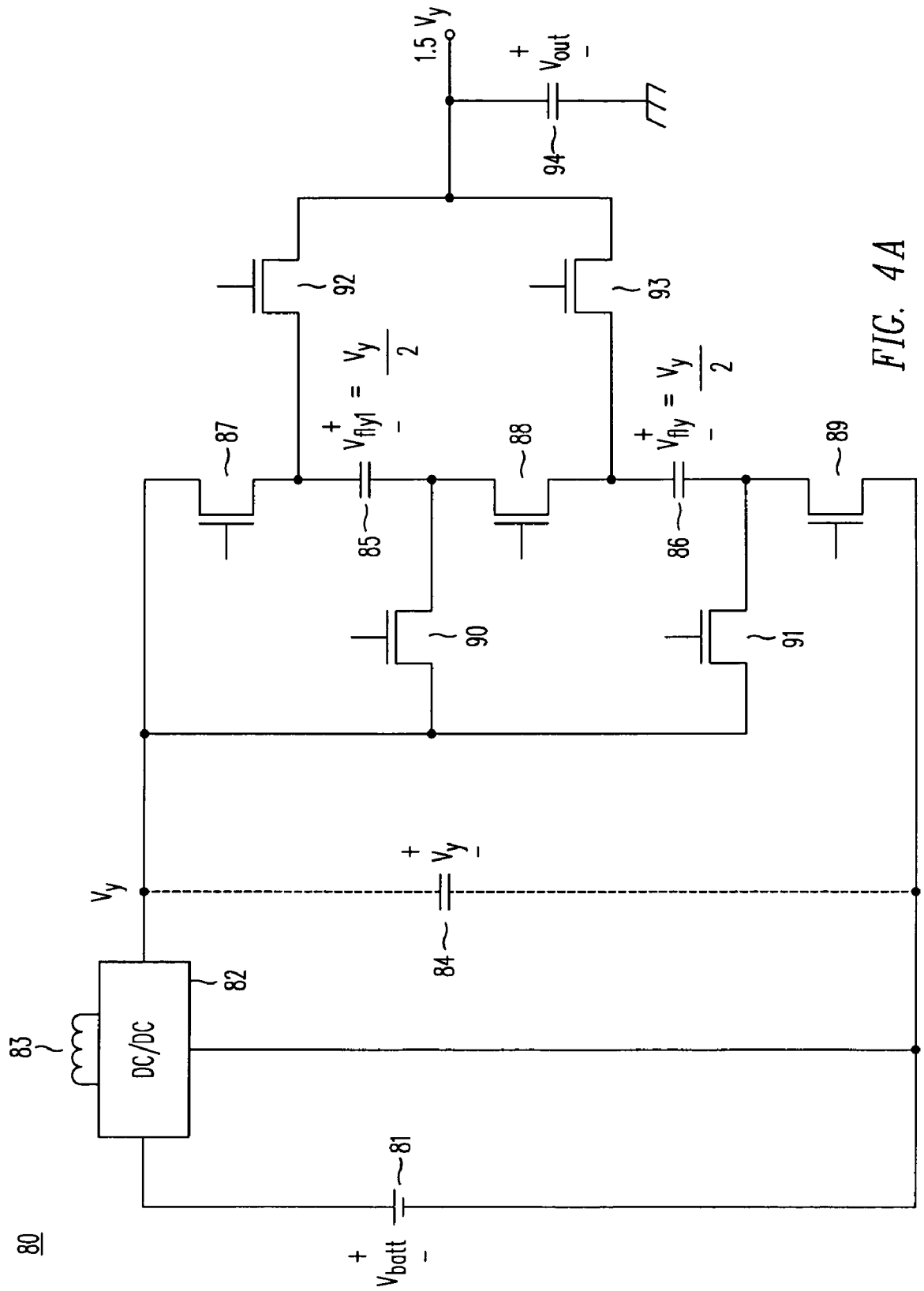
FIG. 4A is a circuit diagram of an LCXU converter with a 1.5× post-converter.

Alternatively, the post-converter may comprise a fractional charge pump circuit, as shown in converter 80 of FIG. 4A, comprising a battery or power source 81, a switching voltage pre-regulator 80A with inductor 83, and an intermediate reservoir capacitor 84 charged to an intermediate voltage $V_y$. Depending on the connections of inductor 83, pre-regulator 80A may comprise either a step-up or a step-down converter.

The output voltage $V_y$ of pre-regulator 80A powers a charge pump 80B here shown using a fractional or 1.5× topology comprising two flying capacitors 85 and 86, a network of power MOSFETs 87, 88, 89, 90, 91, 92 and 93 and an output capacitor 94. A load 97 is connected in parallel with output capacitor 94. The control circuit for MOSFETs 87, 88, 89, 90, 91, 92 and 93 (not shown) charges capacitors 85 and 86 by turning on MOSFETs 87, 88 and 89 while MOSFETs 90, 91, 92 and 93 remain off and switches the MOSFETs 87, 88, 89, 90, 91, 92 and 93 to transfer charge to capacitor 94. Charge transfer occurs by turning on MOSFETs 90, 91, 92 and 93 while MOSFETs 87, 88, and 89 are biased off.

Figure 4B:
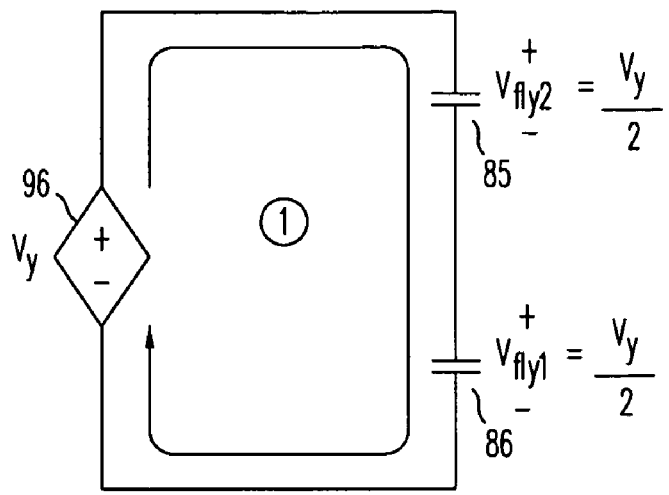
FIGS. 4B and 4C are equivalent circuit diagrams of the LCXU converter of FIG. 4A during the charging and charge transfer phases, respectively.

The operating principle of fractional converter 80 can be illustrated by representing the charging of flying capacitors 85 and 86, each to a voltage $V_y/2$ as shown in the equivalent circuit 95 of FIG. 4B, where dependent voltage source 96 represents the output of pre-regulator 80A and charged capacitor 84. During charging, a transient current ● flows until each of capacitors 85 and 86 reaches a voltage equal to $V_y/2$, assuming that capacitances 85 and 86 are equal in magnitude.

Figure 4C:
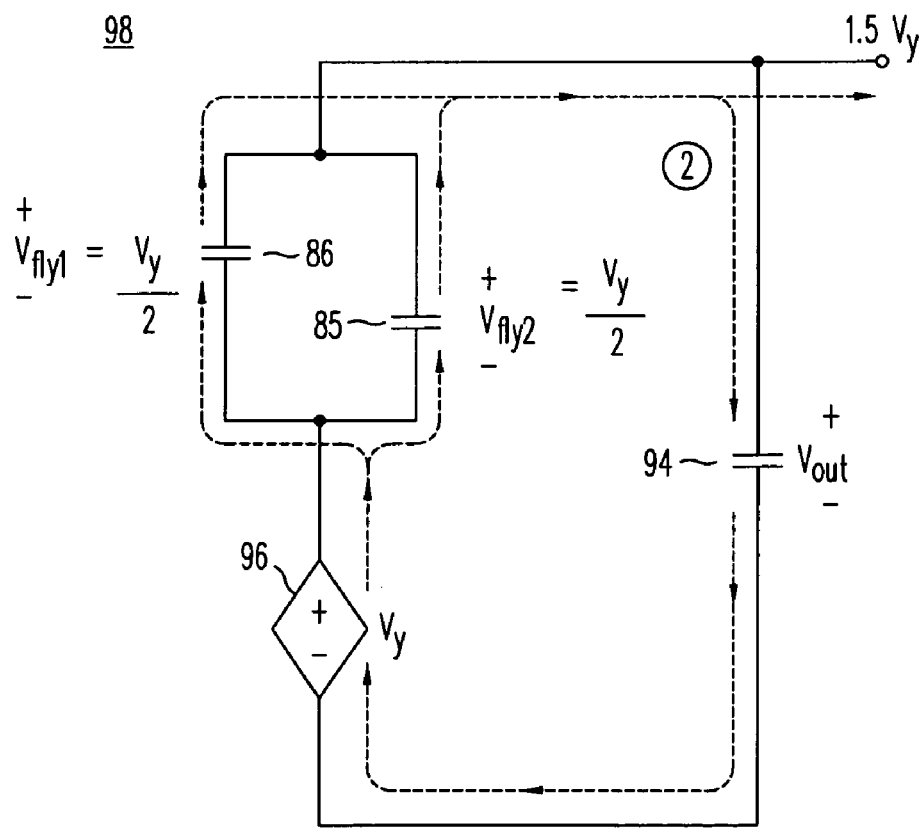

During the charge transfer cycle, shown by equivalent circuit 98 in FIG. 4C, charged flying capacitors 85 and 86 are connected in parallel and their parallel combination is electrically stacked atop dependent voltage source 96 (the output voltage of pre-regulator 80A. Since the negative terminals of capacitors 85 and 86 are connected to the positive terminal of voltage source 96, the voltages add. Capacitor 94 is then charged to a voltage of $(V_y+0.5V_y)$ or $1.5V_y$, one and a half times the output voltage of pre-regulator 50A. Since the output voltage is fifty percent more than the intermediate voltage $V_y$, the post converter 80B acts as a fractional step-up stage.

A transient current ● flows to transfer charge to capacitor 94 and to provide any current needed by an electrical load 97 connected in parallel to capacitor 94. The series impedance of this loop affecting current ● includes any parasitic resistance included within controlled voltage source 96. In other words the transient current capability of circuit 80 is affected by the design of pre-regulator 80A and the capacitance and type of capacitors 85 and 86.

The inductive pre-regulators 50A and 80A in LCXU converters 50 and 80 may comprise any type of DC-to-DC switching converter but preferably comprise either a Buck converter or a boost converter. In the case of a Buck converter, the magnitude of the intermediate voltage $V_y$ is less than the magnitude of the input voltage $V_{batt}$ and the pre-regulator 50A or 80A steps down the supply voltage. Converters 50 and 80 are then examples of previously disclosed LCDU converters, where the first stage steps down the input voltage $V_{batt}$ and the second stage steps up the intermediate voltage $V_y$.

Depending on its operating conditions, using feedback control such a circuit can dynamically adjust to changing conditions to maintain an output voltage less than, equal to, or greater than the input voltage. In response to feedback, the pre-regulator's $V_y$ output voltage can be controlled using fixed frequency pulse width modulation, i.e. PWM, or variable frequency techniques.

In fixed frequency operation, the Buck converter's output voltage is given by $$V_y = DV_{batt}$$

where D is the duty factor of the main switching MOSFET in the Buck converter. The post converter has a transfer function of circuits 50 and 80 have a voltage transfer function given by $$V_{out} = nV_y$$

where n>1, i.e., n=2 in the case of doubler post-converter 50B or n=1.5 in the case of fractional post-converter 80B. Combining these terms, the overall LCDU transfer function is given by $$V_{OUT} = nV_y = nDV_{batt}$$

Given the values of n as either 1.5 or 2, and D ranging from 5% to 95% then the voltage conversion ratio $V_{OUT}/V_{batt}$ of this converter family can be less than unity for step-down operation, greater than unity for step-up operation, or operating at or near unity when $V_{OUT} \approx V_{batt}$. The LCDU converter can cover this wide range without changing operating modes, even at the unity voltage conversion condition, offering great benefit over conventional prior-art Buck-boost converters which suffer from instability and poor performance during mode transitions.

Alternatively, the inductive pre-regulators 50A and 80A in LCXU converters 50 and 80 comprise a boost converter. In such a case, the magnitude of the intermediate voltage $V_y$ is greater than the magnitude of the input voltage $V_{batt}$ and the pre-regulator 50A or 80A steps up the supply voltage. Converters 50 and 80 are then examples of previously disclosed LCUU converters, where the first stage steps up the input voltage $V_{batt}$ and the second stage steps-up the intermediate voltage $V_y$ even more.

Depending on its operating conditions, using feedback control the LCUU circuit can dynamically adjust to changing conditions to maintain an output voltage from input voltage less than, equal to, or greater than its input. In response to feedback, the pre-regulator's $V_y$ output voltage can be controlled using fixed frequency pulse width modulation, i.e. PWM, or variable frequency techniques.

In fixed frequency operation, the boost converter's output voltage is then given by $$V_y = \frac{1}{1-D} V_{batt}$$

where D is the duty factor of the main switching MOSFET in the boost converter, not the synchronous rectifier MOSFET. As mentioned previously, the post converter 50B or 80B has a transfer function given by $$V_{OUT} = nV_y$$

where n>1, i.e., n=2 in the case of doubler post-converter 50B or n=1.5 in the case of fractional post-converter 80B. Combining these terms, the overall LCUU transfer function is then given by $$V_{OUT} = nV_y = \frac{n}{1-D} V_{batt}$$

Given the values of n as either 1.5 or 2, and D ranging from 5% to 95% then the voltage conversion ratio $V_{OUT}/V_{batt}$ of this LCUU converter family is always greater than unity, meaning it can only step up the input voltage.

The advantage of the LCUU converter is it can achieve large step-up conversion ratios even at a 50% duty factor. For example if n=2, i.e. using a doubler post-converter, then at a 50% duty factor, the voltage conversion ratio $V_{OUT}/V_{batt}=4$, exhibiting an output voltage quadruple its input. In a conventional prior-art boost converter, a 4× conversion ratio requires operating at a 75% duty factor. At a 75% duty factor, the doubler-type LCUU converter can deliver an output eight times that of the prior art boost.

One major advantage of operation near 50% duty factor is that the frequency of the converter can be increased and the size of the inductor in the pre-regulator can be decreased without limiting the duty factor range in order to avoid the narrow pulse problem described previously. Another advantage is that near a 50% duty factor, the MOSFET currents do not require high peak currents because more time is available to transfer energy from the battery into the inductor and from the inductor into the output capacitor. So the LCUU converter offers a number of advantages compared to prior art boost converters.

Improved LCXU Switching Converters

In the LCXU converter family, energy transfer from the post-converter to the output capacitor involves the series combination of the pre-regulator and one or more flying capacitors. For example, referring to the doubler-type LCXU converter 50 shown in FIG. 3A, during charging of the output capacitor 60, converter 50 behaves as shown in circuit 70 (FIG. 3C), with flying capacitor 55 in series with voltage source 66, an idealized element representing pre-regulator 50A. Current ● flows during the charging of output capacitor 60 and also to supply current to any load attached in parallel to capacitor 60. During alternate cycles when flying capacitor 55 is being charged, output capacitor 60 must supply any current required by the load.

Ideally, current ● is supplied by a voltage source in series with a capacitor, and as such should be able to supply high transient currents on demand with no warning. In reality however, voltage source 66 is a Buck or boost converter or some other DC/DC converter circuit with intrinsic limitations in current, especially if capacitor 54 is small. These components add series resistance to the idealized equivalent circuit 70, and limit the ability of converter 50 to react to changes in the load's current demand. As a result of this equivalent series parasitic resistance, transient voltage regulation can suffer. This poor response adversely impacts the step load response capability of converter 50 and can only be avoided by increasing the magnitude of capacitor 54 or 60.

In an LCXU converter of this invention, the series resistance of the converter during charge transfer is made independent of series resistance within the pre-regulator circuit and transient load current capability is improved commensurately. This new topology has a unique feature that during discharge the current no longer flows through the pre-regulator. Transient voltage regulation is therefore improved using this technique.

Figure 5A:
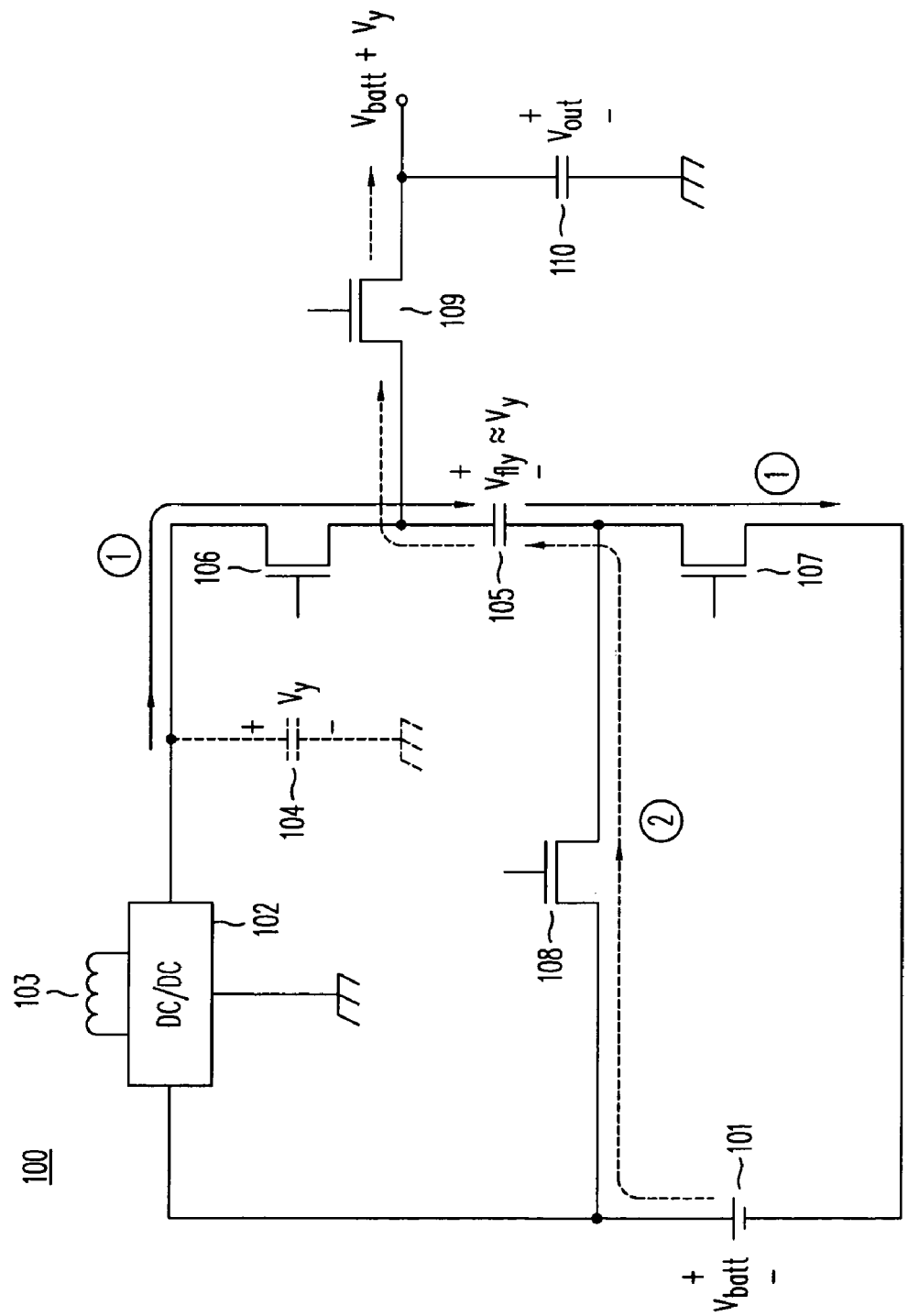
FIG. 5A is a circuit diagram of an LCXU converter with a 2× post-converter according to the invention.

One embodiment of this invention is shown FIG. 5A, wherein a converter 100 comprises a battery or power source 101, a switching voltage converter 102 with inductor 103, and an intermediate reservoir capacitor 104 charged to a voltage $V_y$. Depending on the connections of inductor 103, pre-regulator 100A may comprise either a step-up or a step-down converter.

The voltage $V_y$ at the output of pre-regulator 100A powers a portion of a post-converter charge pump 100B, which in this embodiment uses a doubler topology comprising a single flying capacitor 105, a network of power MOSFETs 106, 107, 108 and 109 and an output capacitor 110. The control circuit for MOSFETs 106, 107, 108 and 109 (not shown) charges capacitor 105 by turning on MOSFETs 106 and 107 while MOSFETs 108 and 109 remain off, and then transfers the charge from capacitor 105 to capacitor 110 by turning on MOSFETs 108 and 109 while MOSFETs 106 and 107 are biased off.

In contrast to converter 50 shown in FIG. 3A, converter 100 includes a MOSFET 108, with one terminal connected to the negative terminal of the flying capacitor 105, and a second terminal connected to the positive terminal of battery 101. This topological change has a significant change in the operation of converter 100 in that, during charge transfer, the negative terminal of the flying capacitor 105 is connected, via MOSFET 108, to the battery voltage $V_{batt}$ rather than to $V_y$, the output voltage of DC/DC pre-regulator 100A.

Figure 5B:
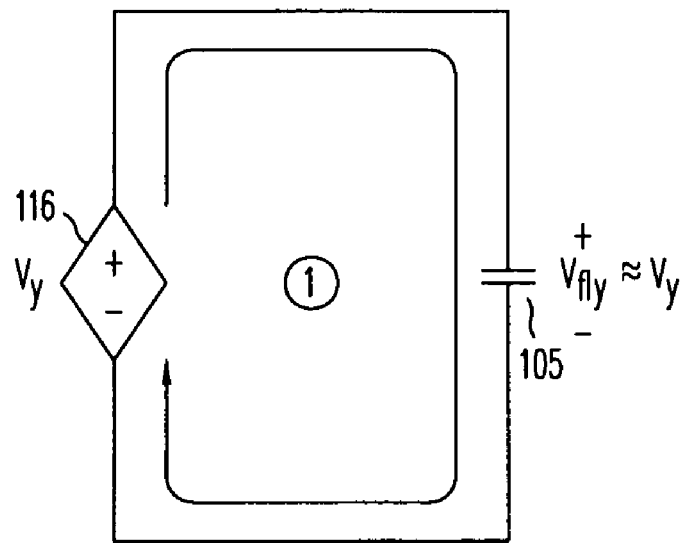
FIGS. 5B and 5C are equivalent circuit diagrams of the LCXU converter of FIG. 5A during the charging and charge transfer phases, respectively.

Converter 100 is thus topologically distinct from converter 50, wherein MOSFET 58 is connected to the intermediate voltage $V_y$. In converter 100, the corresponding MOSFET 108 is instead tied directly to the voltage input $V_{batt}$, not to intermediate voltage $V_y$. The operating principle of converter 100 can be illustrated by representing the charging of flying capacitor 105 to a voltage $V_y$ as in the equivalent circuit 115 of FIG. 5B where dependent voltage source 116 represents the output of pre-regulator 100A and charged capacitor 104.

During charging, a transient current ● flows until capacitor 105 reaches its final voltage $V_y$ in a manner identical to the charging of capacitor 54 in converter 50.

Figure 5C:
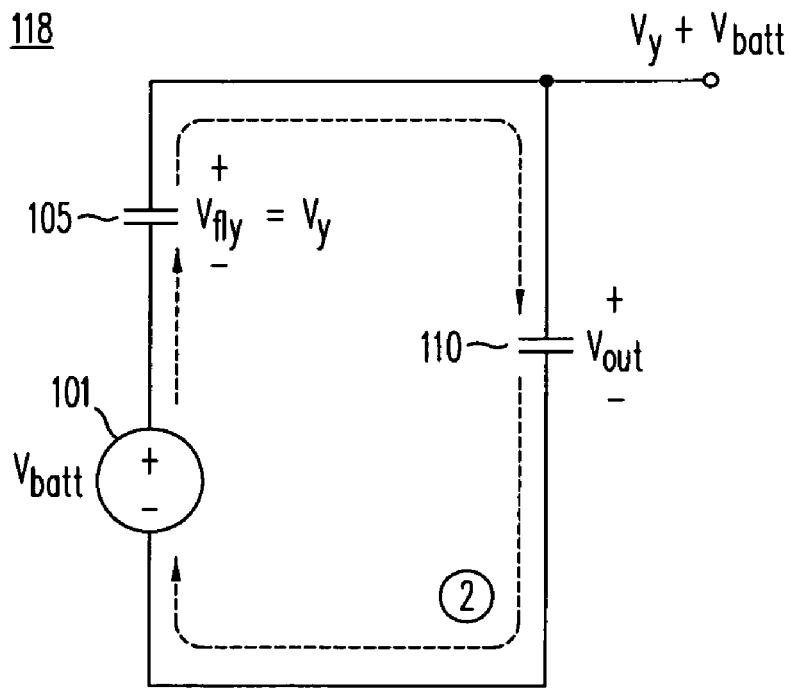

During the charge transfer cycle, as shown in the equivalent circuit 118 of FIG. 5C, the charged flying capacitor 105 is electrically stacked atop the input voltage source $V_{batt}$, not atop dependent voltage source 116 (which represents the output of pre-regulator 100A and charged capacitor 104). Since the negative terminal of flying capacitor 105 is connected to the positive terminal of voltage source 101, the voltages add. Capacitor 110 is then charged to a voltage $(V_{batt}+V_y)$. This voltage is not equal to twice the intermediate voltage $V_y$ at the output of pre-regulator 100A, but it is clearly greater than $V_{batt}$.

As shown in FIG. 5C, the transient current ● flows during the charge transfer phase to capacitor 110 and to provide any current needed by an electrical load connected in parallel to capacitor 110. The series impedance of this loop affecting current ● includes any parasitic resistance included within the battery or other voltage source 101. Dependent voltage source 116 is therefore not involved during the charge transfer from the flying capacitor 105 to the output capacitor 110. The transient current capability of converter 100 is improved because it does not depend on the design of pre-regulator 100A or on capacitor 104.

Thus, in accordance with the invention, during the charging phase, the pre-regulator 100A is used to charge the flying capacitor 105 to an intermediate voltage $V_y$, and then, during the charge transfer phase, the intermediate voltage $V_y$ is added to the voltage $V_{batt}$ of the battery or other voltage source 101 to determine the output voltage of the DC/DC converter 100. The value of the intermediate voltage $V_y$ depends on the construction and operation of pre-regulator 100A. The current during charge transfer, however, does not depend on conduction through the pre-regulator 100A.

High-transient-capable LCXU converter 100 may be implemented as a LCDU converter, wherein pre-regulator 100A is a Buck or step-down pre-regulator, or alternatively as a LCUU converter, wherein pre-regulator 100A is a boost or step-up pre-regulator.

Embodiment of High-Transient-Capable LCDU Converter

Figure 6A:
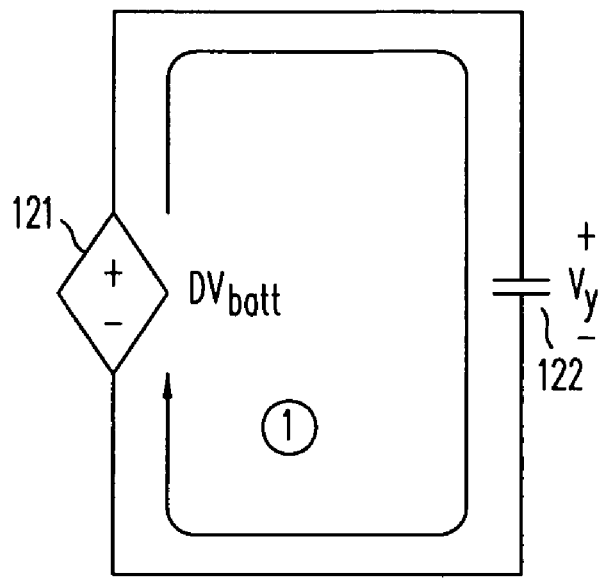
FIGS. 6A and 6B are equivalent circuit diagrams of an LCDU converter with a 2× post-converter during the charging and charge transfer phases, respectively.
Figure 6B:
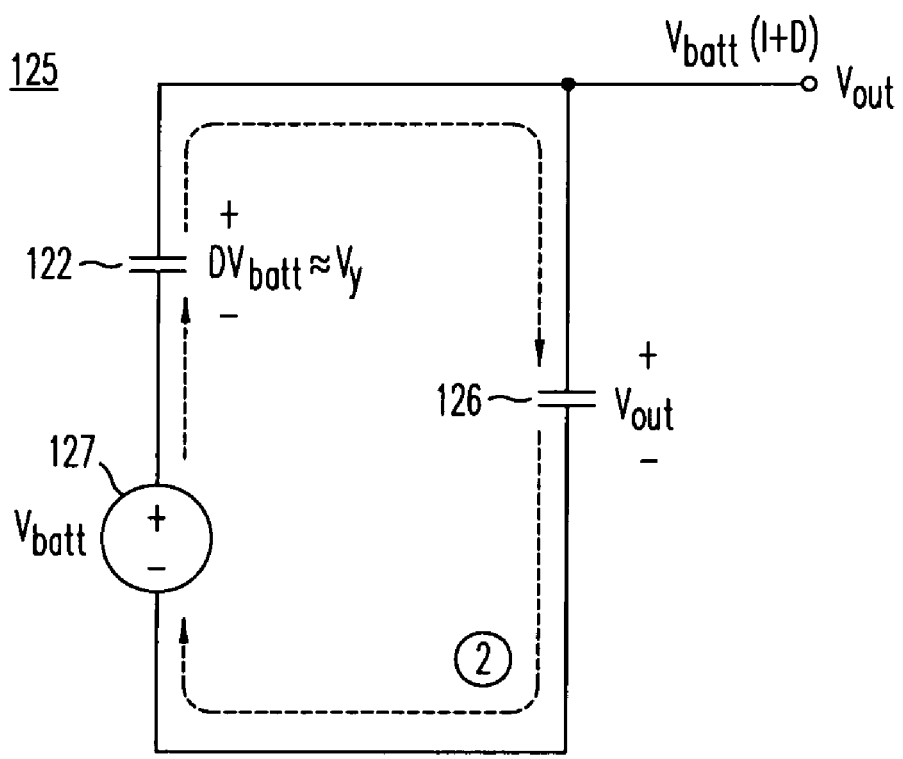

If the disclosed LCXU converter is adapted for fixed frequency down-up operation, the pre-regulator stage exhibits a transfer characteristic $V_y=DV_{batt}$. Accordingly, as shown in the equivalent circuit 120 of FIG. 6A, during the charging phase, the LCDU converter uses a dependent voltage source 121 to charge flying capacitor 122 to a voltage $V_y$ with a transient current ●. During the charge transfer phase, as shown in the equivalent circuit 125 of FIG. 6B, charged flying capacitor 122 is electrically stacked atop the voltage $V_{batt}$ of the input voltage source 127. As a result, a current ● flows to charge output capacitor 126 to its final value $V_{OUT}$. Since voltage source 127 and flying capacitor 122 are series connected, the voltage $V_{OUT}$ is sum of $V_{batt}$ and $V_y$:

$$V_{OUT}=V_{batt}+V_y=V_{batt}+DV_{batt}=V_{batt}(1+D)$$

The equivalent output-to-input voltage transfer ratio of the embodiment of the LCDU converter disclosed herein is then given by $$\frac{V_{OUT}}{V_{batt}} = (1 + D)$$

The previously disclosed 2×-type LCDU converter 50 has a voltage transfer ratio of $V_{OUT}/V_{batt}=2D$, which means that converter 50 can operate either below or above a unity transfer ratio. In contrast, the LCDU version of converter 100 always operates above a unity transfer ratio. Specifically, as D varies from zero to 100%, the transfer ratio of the LCDU version of converter 100 varies from 1× to 2×. So even though the converter involves both step down and step up stages, the magnitude of the doubler type post-converter is greater than the step-down range of the pre-regulator and the net result is step-up only operation.

If variable frequency control is employed, the duty factor D is replaced by the quantity $t_{on}/(t_{on}+t_{off})$, where $t_{on}$ is time period during which a switch allowing a magnetizing current to flow into inductor 103 is turned on and $t_{off}$ is the time period during which the switch is turned off. This allows either the magnetizing time of inductor 103 and the duration allowed for current recirculation, i.e. when the current inductor current declines, to be adjusted dynamically on a cycle by cycle basis.

Figure 6C:
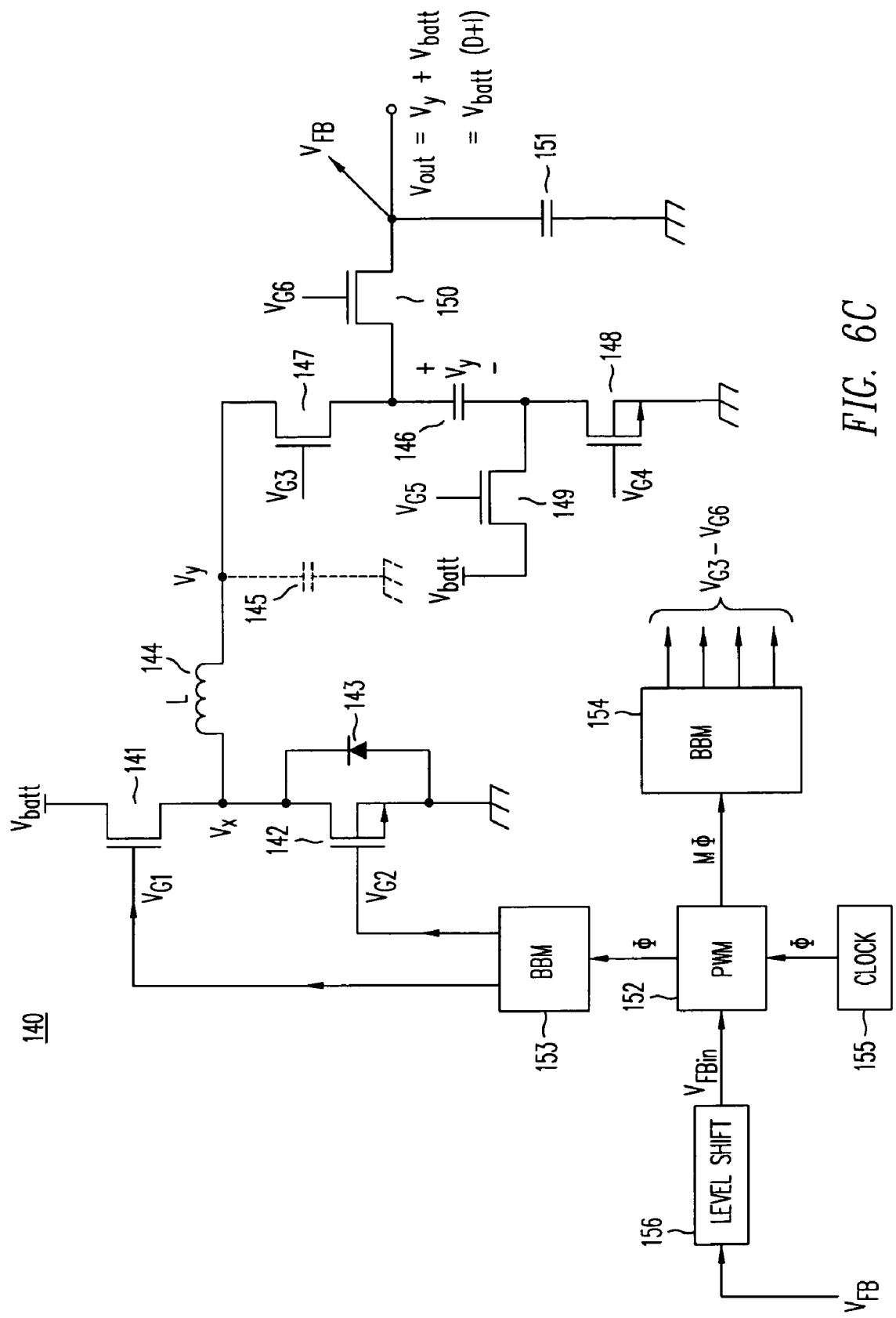
FIG. 6C is a circuit diagram of the LCDU converter with 2× post-converter.

An embodiment of a high-transient-capable LCDU converter 140 is shown in FIG. 6C. Converter 140 includes a pre-regulator 140A comprising a low-side N-channel MOSFET 142 and a high side MOSFET 141 connected in series between the input voltage $V_{batt}$ and ground, an inductor 144, and an optional capacitor 145. (Note: As used herein, "ground" refers to circuit ground which may be any voltage different from $V_{batt}$.) A post-converter 140B comprises flying capacitor 146, MOSFETs 147, 148, 149 and 150, and output capacitor 151. High-side MOSFET 141 may be P-channel or N-channel with appropriate changes in the gate drive circuitry and the polarity of the gate drive signal $V_{G1}$.

The MOSFET gate drive and timing is achieved using pulse width modulation controller 152 with clock or ramp generator 155, and break-before-make (BBM) circuits 153 and 154. Pulse width modulation is achieved in response to a control voltage $V_{FB}$ using negative feedback from the output voltage $V_{OUT}$ of converter 140. Level shifter 156 adjusts the magnitude of $V_{FB}$ to the appropriate voltage to force $V_{OUT}$ to some targeted value. PWM controller 152 may alternatively operate using variable frequency control.

The operation of BBM circuit 153 insures that MOSFETs 141 and 142 are driven out of phase to avoid shoot-through conduction. Specifically, MOSFET 141 conducts to magnetize inductor 144, i.e. increase its current, while otherwise diode 143 and synchronous rectifier MOSFET 142 provide a current recirculation path whenever MOSFET 141 is off.

Similarly, BBM circuit 154 insures that MOSFETs 147 and 148 conduct in phase and are driven out of phase with MOSFETs 149 and 150. Specifically, MOSFETs 147 and 148 both conduct to charge flying capacitor 146, and otherwise MOSFETs 149 and 150 conduct to transfer charge from flying capacitor 146 to output capacitor 151. In a preferred embodiment, BBM circuits 153 and 154 are driven in phase by a signal from a common clock generator 155.

In one embodiment, inductor 144 is magnetized while flying capacitor 146 is charged, requiring MOSFETs 141, 147 and 148 be driven in phase to conduct simultaneously. In another embodiment, inductor 144 is magnetized while the charge on flying capacitor 146 is transferred to output capacitor 151, requiring MOSFET 141 to be driven in phase, i.e. conduct simultaneously, with MOSFETs 149 and 150, and out of phase with MOSFETs 147 and 148. The size of optional capacitor 145 must be adjusted commensurate with the gate timing and the operating current range of the converter 140.

In monolithic implementations, capacitance 145 represents in part the capacitance that is naturally associated with the formation of the wells, i.e. the P-N junctions, used to form and integrate MOSFETs 147 through 150.

Embodiment of High-Transient-Capable LCUU Converter

Figure 7A:
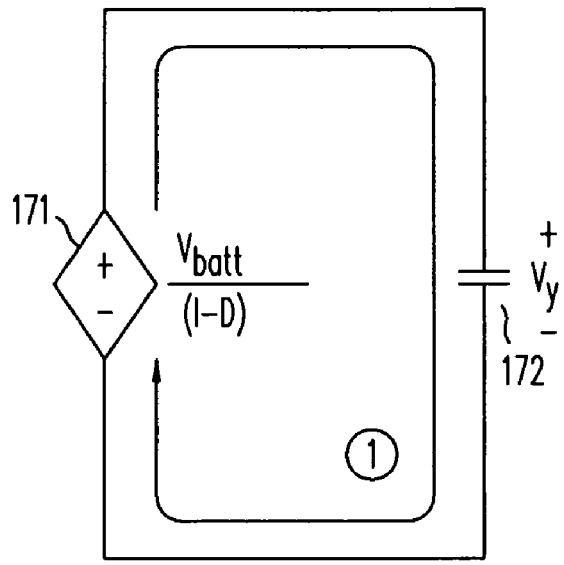
FIGS. 7A and 7B are equivalent circuit diagrams of an LCUU converter with a 2× post-converter during the charging and charge transfer phases, respectively.
Figure 7B:
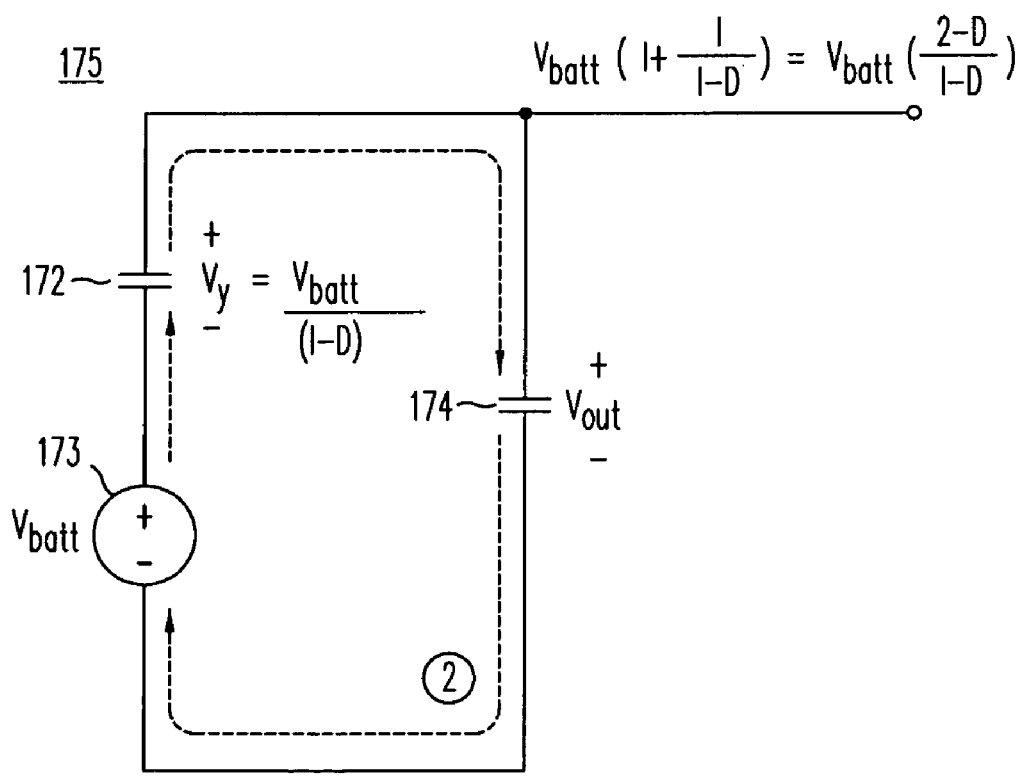

If the disclosed LCXU converter is adapted for fixed frequency step-up (or more accurately up-up) operation, the pre-regulator stage exhibits a transfer characteristic $V_y=V_{batt}/(1-D)$. Accordingly, as shown in the equivalent circuit 170 of FIG. 7A, during the charging phase, the LCUU converter uses dependent voltage source 171 to charge flying capacitor 172 to a voltage $V_y$ with a transient current ●. During the charge transfer phase, as shown in the equivalent circuit 175 of FIG. 7B, charged flying capacitor 172 is electrically stacked atop the voltage $V_{batt}$ of the input voltage source 173, whereby a current ● flows to charge output capacitor 174 to its final value $V_{OUT}$. Since flying capacitor 172 and voltage source 173 are series connected, the voltage $V_{OUT}$ is sum of $V_{batt}$ and $V_y$:

$$V_{OUT} = V_{batt} + V_y$$
$$= V_{batt} + \frac{1}{1-D}V_{batt}$$
$$= V_{batt}\left(1 + \frac{1}{1-D}\right)$$
$$= V_{batt}\left(\frac{2-D}{1-D}\right)$$

The equivalent output-to-input voltage transfer ratio of the embodiment of the LCUU converter disclosed herein is then given by $$\frac{V_{OUT}}{V_{batt}} = \left(1 + \frac{1}{1-D}\right) = \frac{2-D}{1-D}$$

The previously disclosed 2×-type LCUU converter 50 has a voltage transfer ratio of $V_{OUT}/V_{batt}=2/(1-D)$. In contrast, the LCUU version of converter 100 always operates above a unity transfer ratio but at a voltage less than double the value of the intermediate voltage $V_y$. Specifically, as D varies from zero to 75%, the transfer ratio varies of the LCUU version of converter 100 varies from 2× to 6×. Over the same range, the previously disclosed 2×-type LCUU converter 50 would exhibit a range of 2× to 8×.

So even though the converter involves only step-up stages, the transfer ratio range of the doubler type post-converter 50 shown in FIG. 3A is greater than the transfer ratio range of the LCUU version of the high transient capable converter 100 shown in FIG. 5A. Nonetheless, the LCUU version of converter 100 still provides an extremely broad range of transfer ratios. Duty factors above 75% are also possible, but the currents needed to achieve the corresponding transfer ratios can be quite high.

If variable frequency control is employed, the duty factor D is replaced by the quantity $t_{on}/(t_{on}+t_{off})$, allowing either the magnetizing time of inductor 103 and the duration allowed for current recirculation, i.e. when the current inductor current declines, to be adjusted dynamically on a cycle by cycle basis.

Figure 7C:
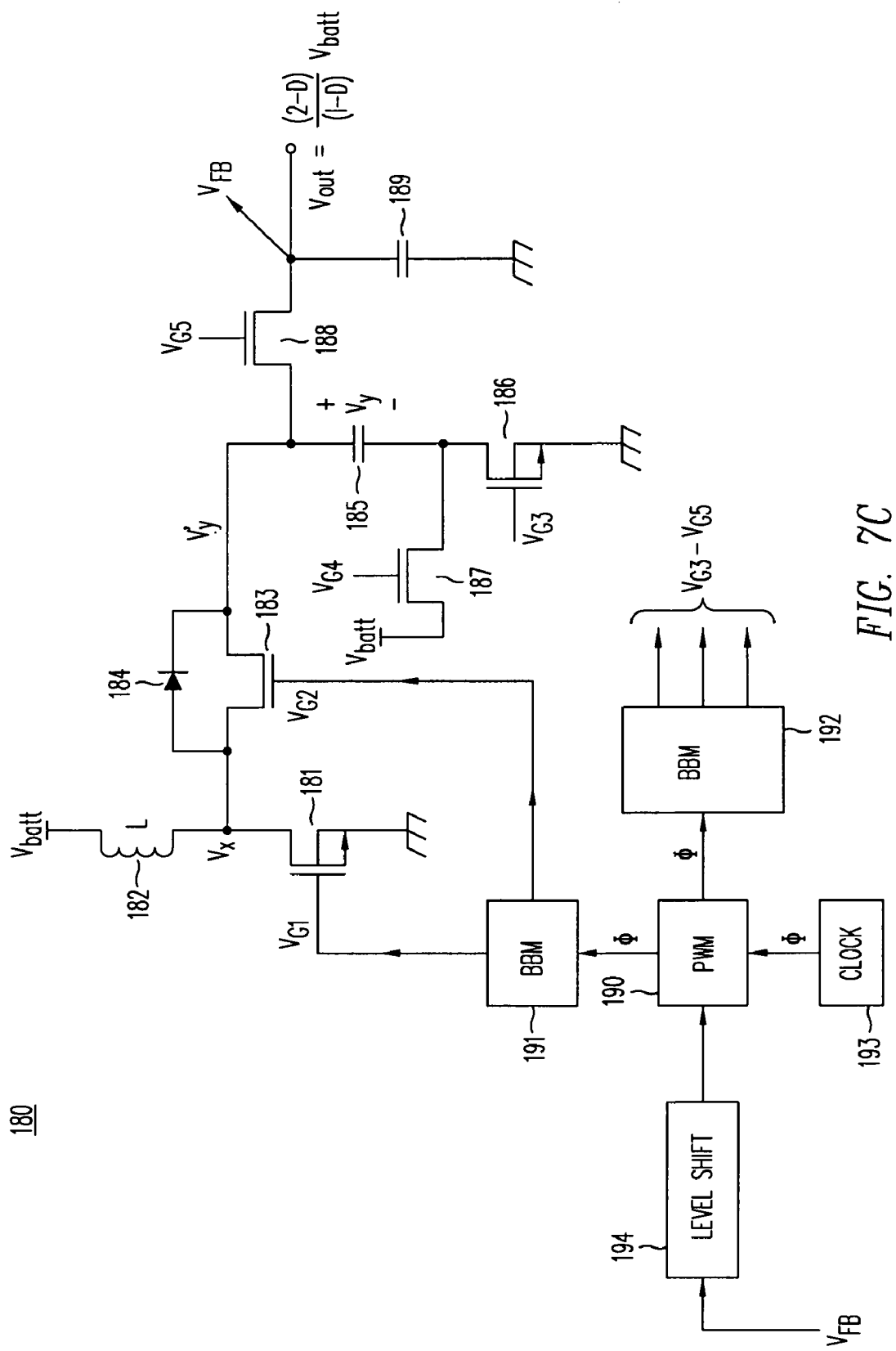
FIG. 7C is a circuit diagram of the LCUU converter with 2× post-converter.

An embodiment of the high-transient-capable LCUU converter 180 is shown in FIG. 7C. Converter 180 includes a pre-regulator 180A comprising low-side N-channel MOSFET 181, floating synchronous rectifier MOSFET 183 with corresponding intrinsic P-N diode 184, inductor 182 and optional capacitor 195 and a post-converter 180B comprising flying capacitor 185, MOSFETs 186, 187 and 188, and output capacitor 189. Synchronous rectifier MOSFET 184 may be P-channel or N-channel with appropriate changes in the gate drive circuitry and the polarity of the gate drive signal $V_{G2}$. MOSFET 184 serves a dual purpose in converter 180, both as a synchronous rectifier to the pre-regulator 180A and as one of the MOSFETs used to control the time when flying capacitor 185 is charged.

MOSFET gate drive and timing is achieved using pulse width modulation controller 190 with clock or ramp generator 193; and break-before-make (BBM) circuits 191 and 192. Pulse width modulation is achieved in response to a control voltage $V_{FB}$ using negative feedback from the output voltage $V_{OUT}$ of converter 180. Level shifter 194 adjusts the magnitude of $V_{FB}$ to the appropriate voltage to force $V_{OUT}$ to some targeted value. PWM controller 190 may alternatively operate using variable frequency control.

Operation of BBM circuit 1191 insures that MOSFETs 181 and 184 are driven out of phase to avoid shoot-through conduction and shorting out of capacitor 195. Specifically, MOSFET 181 conducts to magnetize inductor 182, i.e. increase its current, while otherwise diode 184 and synchronous rectifier MOSFET 183 provide a current path to charge capacitor 195 whenever MOSFET 181 is off.

Similarly, BBM circuit 154 insures that MOSFET 186 conducts in phase and is driven out of phase with MOSFETs 187 and 188. Specifically, MOSFET 186 conducts to charge flying capacitor 185 from capacitor 195. Otherwise, both MOSFETs 187 and 188 are biased to conduct simultaneously to transfer charge from flying capacitor 185 to output capacitor 189. In a preferred embodiment, BBM circuits 191 and 1192 are driven in phase by a signal from a common clock generator 193.

In a preferred embodiment, inductor 182 is magnetized while flying capacitor 185 transfers its charge to output capacitor 189, requiring that MOSFETs 181, 187 and 188 be driven in phase to conduct simultaneously. In the opposite phase, MOSFETs 183 and 186 are biased to conduct simultaneously, thereby charging flying capacitor 185 to a voltage $V'_y$.

Since MOSFET 183 is used as both a synchronous rectifier and for charging the flying capacitor 185, no stable intermediate voltage $V_y$ exists in converter 180 as illustrated in circuit 100. Instead the voltage $V'_y$ acts like $V_y$ but only during the time that MOSFET 181 is off and MOSFETs 183 and 186 are on. The size of optional capacitor 195 can be adjusted commensurate with the gate timing and the operating current range of the converter 180, but capacitor 195 may represent only the parasitic capacitance associated with the formation of the wells, i.e. the P-N junctions, used to form and integrate MOSFETs 183, 186, 187 and 188.

Fractional LCXU Switching Converters with High-Transient Capability

As discussed previously, in a fractional LCXU converter energy transfer from the converter to the output capacitor involves the series combination of the pre-regulator and one or more flying capacitors. For example, referring back to FIG. 4A, during charging of the output capacitor 94, fractional-type LCXU converter 80 behaves in a manner shown in equivalent circuit 95 (FIG. 4B), with flying capacitors 85 and 86 in series with voltage source 96, an idealized element representing pre-regulator 80A. As shown in FIG. 4C, during the charging of output capacitor 94, current ● flows from the parallel combination of flying capacitors 85 and 86 stacked atop voltage source 96 to supply current to any load connected in parallel with output capacitor 94. During the charging phase, when flying capacitors 85 and 86 are being charged, output capacitor 94 must supply any current required by the load.

Ideally, current ● is supplied by a voltage source in series with a capacitor, and as such should be able to supply high transient currents on demand with no warning. In reality however, voltage source 96 is a Buck or boost converter or some other DC/DC converter circuit with intrinsic limitations in current, especially if capacitor 84 is small. These components add series resistance into idealized equivalent circuit 98, and limit the ability of converter 80 to react to changes in the current demands of the load. As a result of this series parasitic resistance, transient voltage regulation can suffer. This poor response adversely impacts the converter's step load response capability and can only be avoided in LCXU converter 80 by increasing the magnitude of capacitors 84 or 94.

In a fractional LCXU converter of the invention, the series resistance of the converter during charge transfer is made independent of series resistance within the pre-regulator circuit, and the transient load current capability is improved commensurately. This new topology has a unique feature that during discharge the current no longer flows through the pre-regulator. Transient voltage regulation is therefore improved using this technique.

Figure 8A:
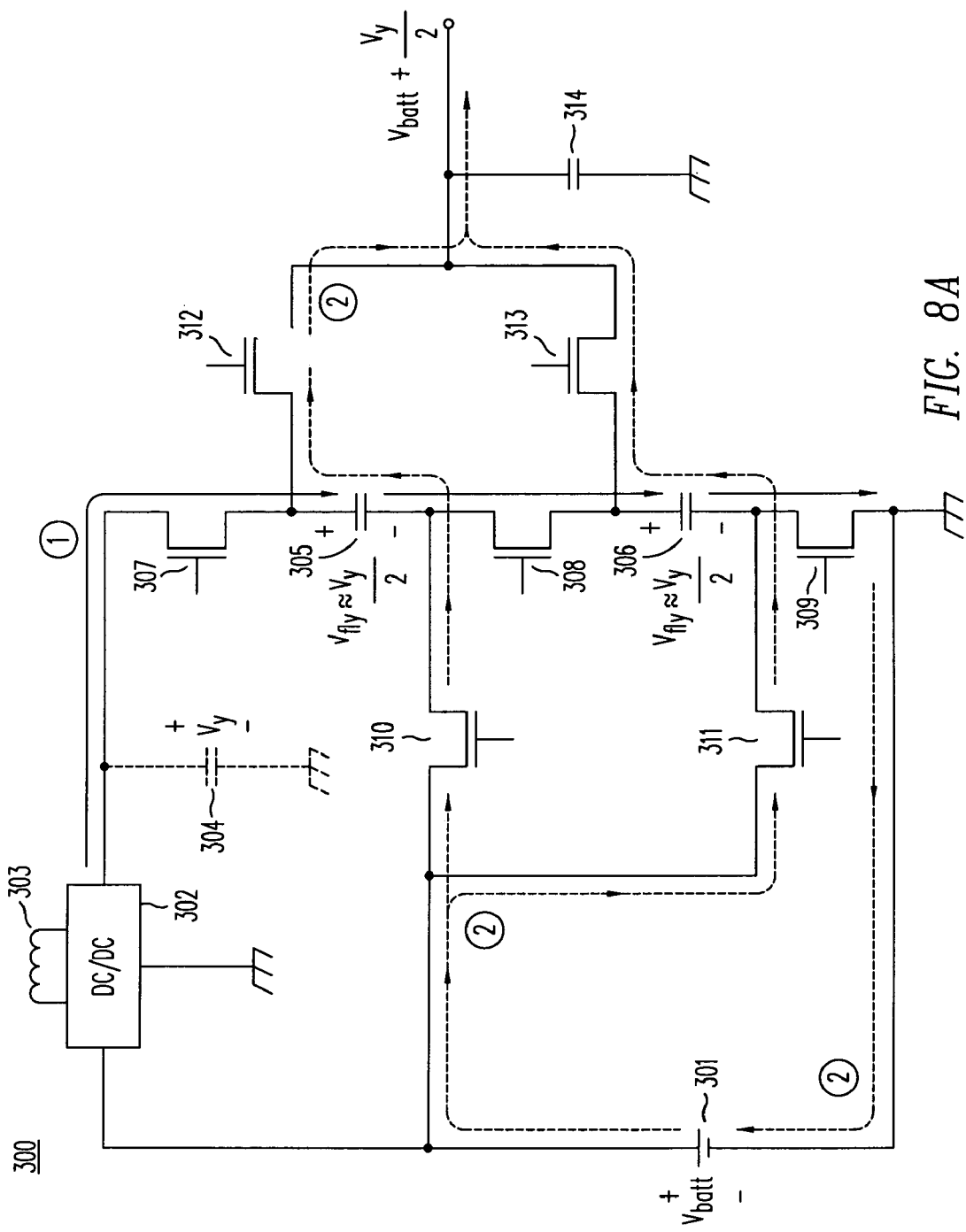
FIG. 8A is a circuit diagram of an LCXU converter with a 1.5× post-converter according to the invention.

One example of this improvement is shown FIG. 8A wherein converter 300 comprises a battery or power source 301, a switching pre-regulator 300A with inductor 303, and an intermediate reservoir capacitor 304 charged to a voltage $V_y$. Depending on the connections of inductor 303, pre-regulator 300A may comprise either a step-up or a step-down converter.

The output voltage $V_y$ of converter 300A powers a portion of a post-converter 300B, which includes a charge pump using a fractional topology comprising two flying capacitors 305 and 306, a network of power MOSFETs 307 through 313 and an output capacitor 314. The control circuit for MOSFETs 307 through 313 (not shown) charges flying capacitors 305 and 306 by turning on MOSFETs 307, 308, and 309 while MOSFETs 310, 311, 312 and 313 remain off, and then transfers the charge on flying capacitors 305 and 306 to capacitor 314 by turning on MOSFETs 310, 311, 312 and 313 while MOSFETs 307, 308 and 309 are biased off.

In contrast to converter 80, shown in FIG. 4A, in converter 300 the negative terminals of the flying capacitors 305 and 306 are connected through MOSFETs 310 and 311, respectively to the positive terminal of battery 301. This topological change creates a significant change in the operation of converter 300. During charge transfer, MOSFETs 310 and 311 are connected to the battery voltage $V_{batt}$ and not to $V_y$, the output of pre-regulator 300A.

Figure 8B:
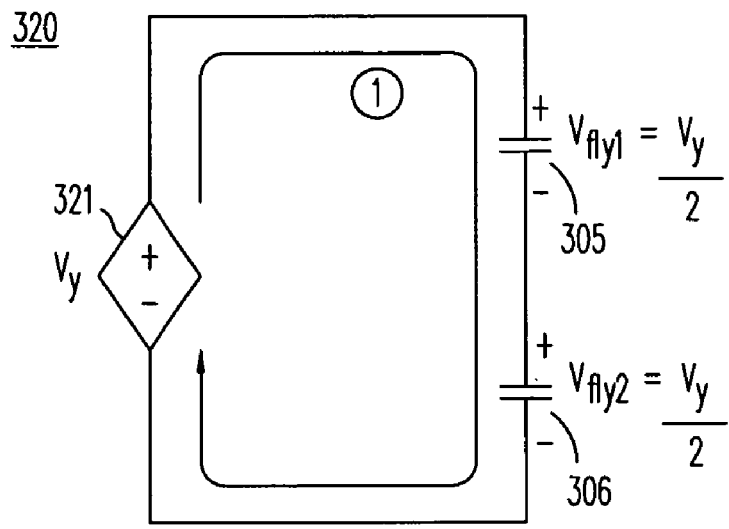
FIGS. 8B and 8C are equivalent circuit diagrams of the LCXU converter of FIG. 8A during the charging and charge transfer phases, respectively.

Circuit 300 is topologically distinct from converter 80 where MOSFETs 90 and 91 are connected to the voltage $V_y$. In converter 300, MOSFETs 90 and 91 are replaced by MOSFETs 310 and 311, which are tied to the input voltage $V_{batt}$, rather than the intermediate voltage $V_y$. The operating principle of converter 300 can be illustrated by representing the charging of series-connected flying capacitors 305 and 306 to a voltage $V_y$, as shown in equivalent circuit 320 of FIG. 8B, where dependent voltage source 321 represents the output of pre-regulator 300A and charged capacitor 304. During the charging of flying capacitors 305 and 306, a transient current ● flows until each of capacitors 305 and 306 reaches the voltage $V_y/2$ in a manner identical to the charging of flying capacitors 85 and 86 in converter 80.

Figure 8C:
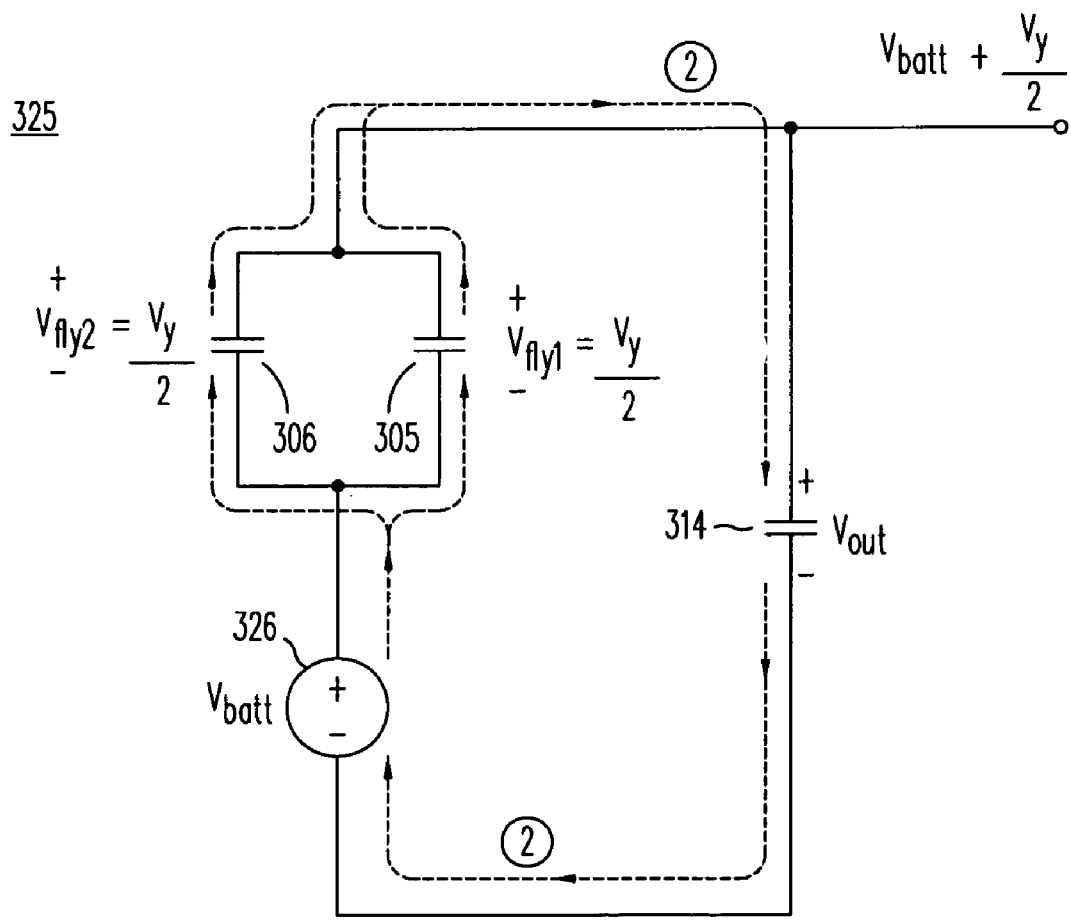

During the charge transfer cycle, shown in the equivalent circuit 325 of FIG. 8C, the charged flying capacitors 305 and 306 are electrically connected in parallel with their parallel combination stacked atop the input voltage source $V_{batt}$, rather than atop dependent voltage source 321. Since the negative terminals of flying capacitors 305 and 306 are connected to the positive terminal of voltage source 301, the voltages add. Capacitor 314 is then charged to a voltage ($V_{batt}$+$V_y$/2). This voltage is not equal to 1.5 times the output of pre-regulator 300A, but it is clearly greater than $V_{batt}$.

Transient current ● flows during the charge transfer phase to capacitor 314 to provide any current needed by an electrical load connected in parallel to capacitor 314. The series impedance of this loop affecting current ● includes any parasitic resistance included within the battery or independent voltage source 301. Dependent voltage source 321 is not involved during the charge transfer from the flying capacitors 305 and 306 to the output capacitor 314. The transient current capability of circuit 326 is improved because it does not depend on the design of pre-regulator 300A or on capacitor 304.

Thus, in accordance with the invention, during the charging phase, the pre-regulator 300A is used to charge each of the flying capacitors to a voltage $V_y$/2 and then, during the charge transfer phase, the voltage $V_y$/2 is added to the voltage $V_{batt}$ of the battery or other voltage source 301 to determine the output voltage of DC/DC converter 300. The value of the voltage $V_y$ depends on the construction and operation of pre-regulator 300A. The current during charge transfer, however, does not depend on conduction through the pre-regulator 300A.

High-transient-capable fractional LCXU converter 300 may be implemented as a LCDU converter, wherein pre-regulator 300A is a Buck or step-down pre-regulator, or alternatively as a LCUU converter, wherein pre-regulator 300A is a boost or step-up pre-regulator.

Embodiment of High-Transient-Capable Fractional LCDU Converter

Figure 9A:
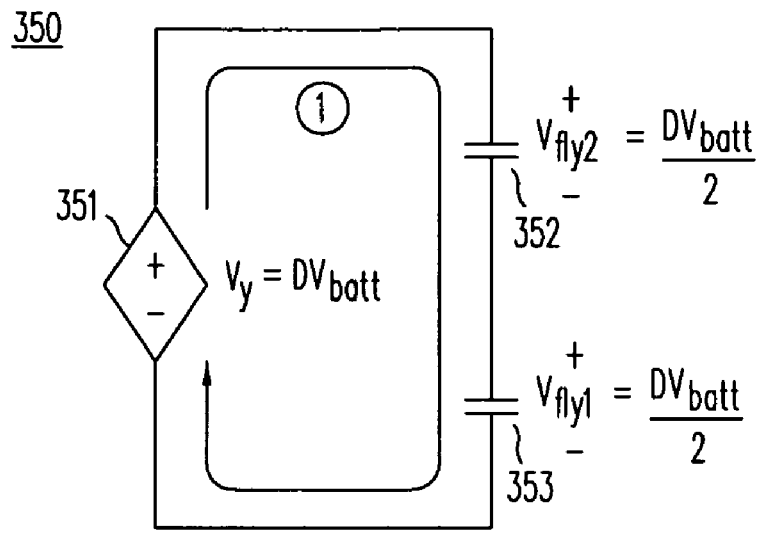
FIGS. 9A and 9B are equivalent circuit diagrams of an LCDU converter with a 1.5× post-converter during the charging and charge transfer phases, respectively.
Figure 9B:
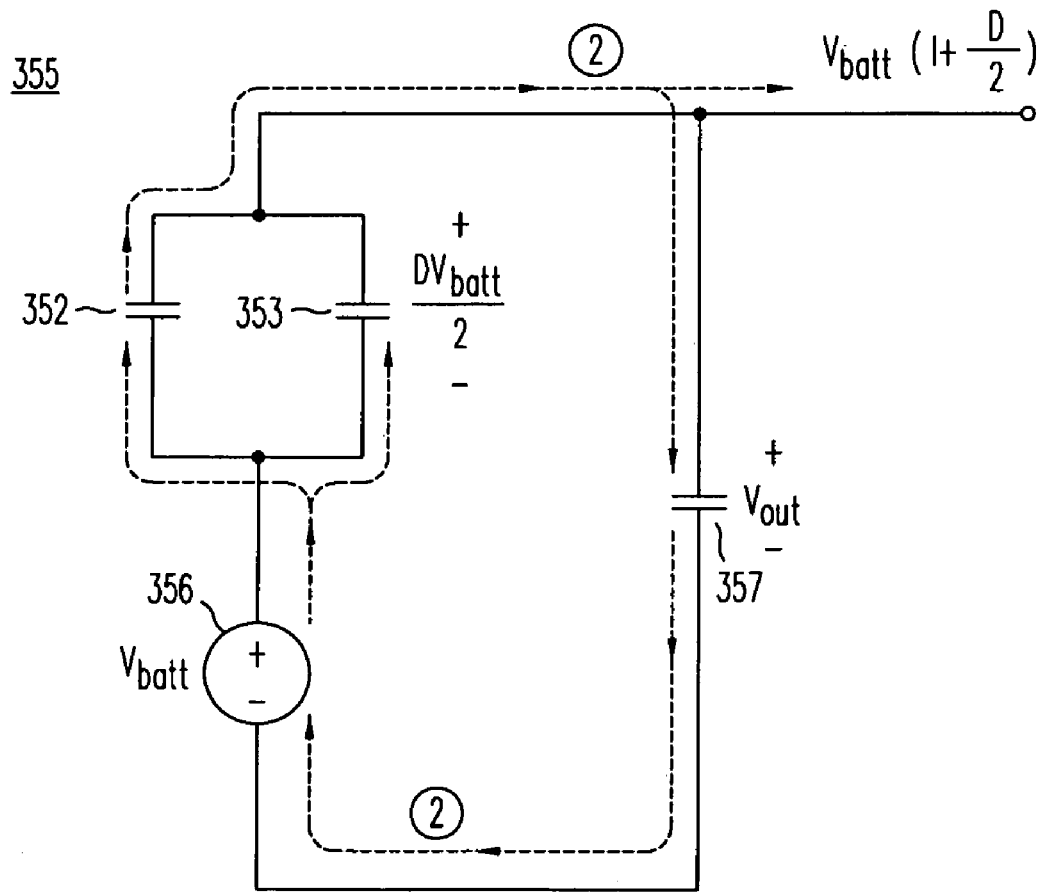

If the disclosed LCXU converter is adapted for fixed frequency down-up operation, the pre-regulator stage exhibits a transfer characteristic $V_y$=$DV_{batt}$. Accordingly, as shown in the equivalent circuit 350 of FIG. 9A, during the charging phase, the LCDU converter uses a dependent voltage source 351 to charge each of flying capacitors 352 and 353 to a voltage $V_y$/2 with transient current ●. During the charge transfer phase 355, as shown in the equivalent circuit 355 of FIG. 9B, charged flying capacitors 352 and 353 are connected in parallel and this parallel combination is electrically stacked atop the voltage $V_{batt}$ of the input voltage source 356. As a result, a current ● flows to charge output capacitor 357 to its final value $V_{OUT}$. Since voltage source 356 and the parallel combination of flying capacitors 352 and 353 are series connected, the voltage $V_{OUT}$ is sum of $V_{batt}$ and $V_y$/2:

$$V_{OUT} = V_{batt} + \frac{V_y}{2} = V_{batt} + 0.5DV_{batt} = V_{batt}\left(1 + \frac{D}{2}\right)$$

The equivalent output-to-input voltage transfer ratio of the embodiment of the fractional LCDU converter disclosed herein is then given by $$\frac{V_{OUT}}{V_{batt}} = \left(1 + \frac{D}{2}\right) = (1 + 0.5D)$$

The previously disclosed 1.5×-type LCDU converter 80 has a voltage transfer ratio of $V_{OUT}$/$V_{batt}$=1.5D, which means that converter 80 can operate either below or above a unity transfer ratio. In contrast, the LCDU version of converter 300 always operates above a unity transfer ratio. Specifically, as D varies from zero to 100%, the transfer ratio varies of the LCDU version of converter 300 varies from 1× to 1.5×. So even though the converter involves both step down and step up stages, the magnitude of the 1.5 type post-converter is greater than the step-down range of the pre-regulator and the net result is step-up only operation.

If variable frequency control is employed, the duty factor D is replaced by the quantity $t_{on}$/($t_{on}$+$t_{off}$), allowing either the magnetizing time of inductor 303 and the duration allowed for current recirculation, i.e. when the current inductor current declines, to be adjusted dynamically on a cycle by cycle basis.

Figure 9C:
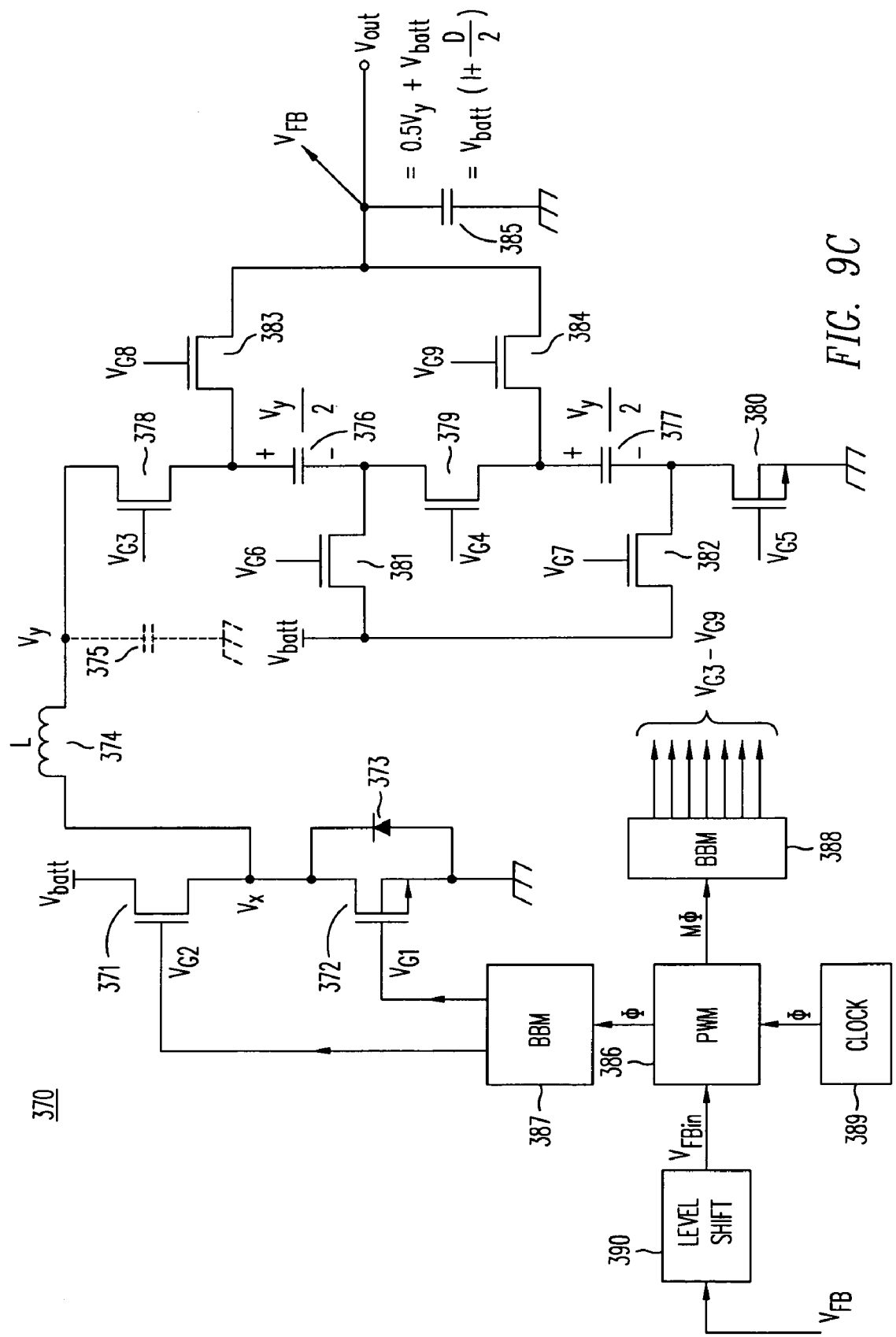
FIG. 9C is a circuit diagram of the LCDU converter with 1.5× post-converter.

An embodiment of a high-transient-capable fractional LCDU converter 370 is shown in FIG. 9C. Converter 370 includes a pre-regulator 370A comprising low-side N-channel MOSFET 372, high side MOSFET 371, inductor 374, and optional capacitor 375. A post-converter 370B comprises flying capacitors 376 and 377, MOSFETs 378, 379, 380, 381, 382, 383 and 384, and output capacitor 385. High-side MOSFET 371 may be P-channel or N-channel with appropriate changes in the gate drive circuitry and the polarity of the gate drive signal $V_{G2}$.

The MOSFET gate drive and timing is achieved using pulse width modulation controller 386 with clock or ramp generator 389, and break-before-make (BBM) circuits 387 and 388. Pulse width modulation is achieved in response to a control voltage $V_{FB}$ using negative feedback from the output voltage $V_{OUT}$ of converter 370. Level shifter 390 adjusts the magnitude of $V_{FB}$ to the appropriate voltage to force $V_{OUT}$ to some targeted value. PWM controller 386 may alternatively operate using variable frequency control.

The operation of BBM circuit 387 insures that MOSFETs 371 and 372 are driven out of phase to avoid shoot-through conduction. Specifically, MOSFET 371 conducts to magnetize inductor 374, i.e. increase its current, while otherwise diode 373 and synchronous rectifier MOSFET 372 provide a current recirculation path whenever MOSFET 371 is off.

Similarly, BBM circuit 388 insures that MOSFETs 378, 379, and 380 conduct in phase and are driven out of phase with MOSFETs 381, 382, 383, and 384. Specifically, MOSFETs 378, 379 and 380 simultaneously conduct to charge flying capacitors 376 and 377, and otherwise MOSFETs 381, 382, 383, and 384 conduct to transfer charge from flying capacitors 376 and 377 to output capacitor 385. In a preferred embodiment, BBM circuits 387 and 388 are driven in phase by a signal from a common clock generator 389.

In one embodiment, inductor 374 is magnetized while flying capacitors 376 and 377 are charged, requiring MOSFETs 371, 378, 379 and 380 to be driven in phase to conduct simultaneously. In another embodiment, inductor 374 is magnetized while the charge on flying capacitors 376 and 377 is transferred to output capacitor 385, requiring MOSFET 371 to be driven in phase, i.e. conduct simultaneously, with MOSFETs 381 through 384, and out of phase with MOSFETs 378 through 380. The size of optional capacitor 375 must be adjusted commensurate with the gate timing and the operating current range of the converter 370.

In monolithic implementations, capacitance 375 represents in part the capacitance that is naturally associated with the formation of the wells, i.e. the P-N junctions, used to form and integrate MOSFETs 378 through 384.

Embodiment of High-Transient-Capable Fractional LCUU Converter

Figure 10A:
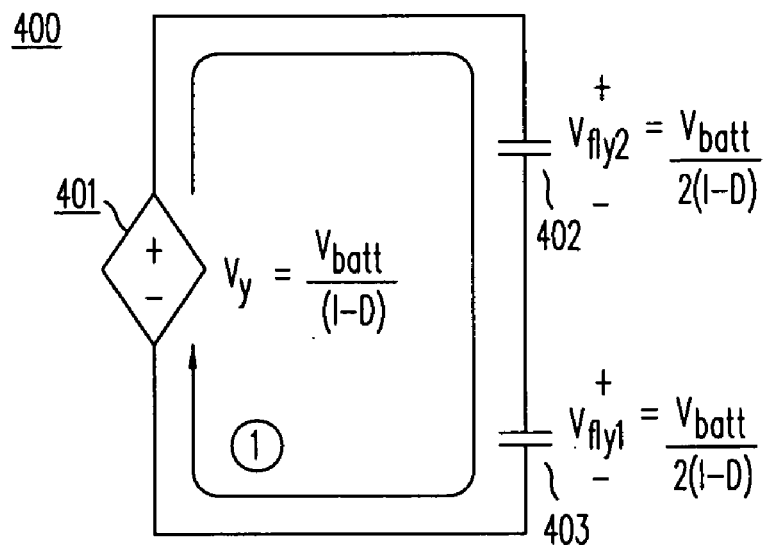
FIGS. 10A and 10B are equivalent circuit diagrams of an LCUU converter with a 1.5× post-converter during the charging and charge transfer phases, respectively.
Figure 10B:
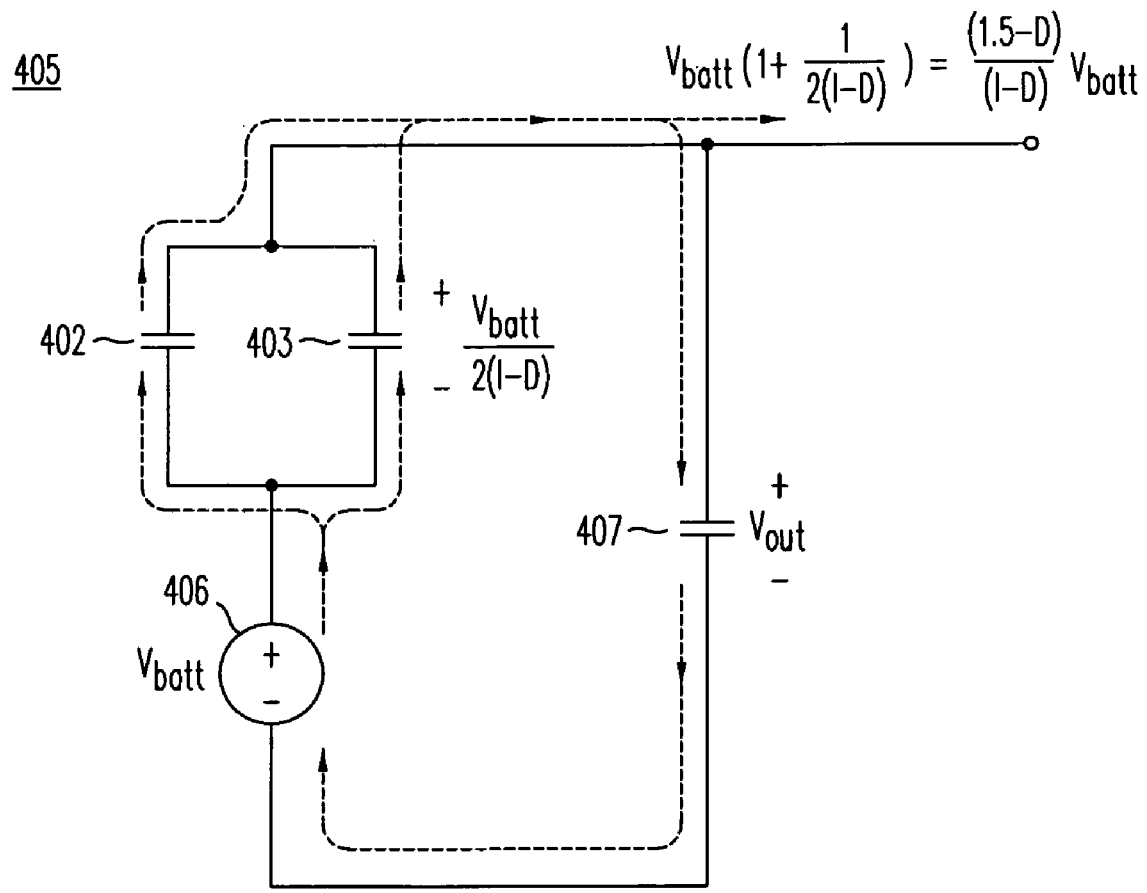

If the disclosed LCXU converter is adapted for fixed frequency step-up (or more accurately up-up operation), the pre-regulator stage exhibits a transfer characteristic $V_y$=$V_{batt}$/(1−D). Accordingly, as shown in the equivalent circuit 400 of FIG. 10A, during the charging phase, the LCUU converter uses dependent voltage source 401 to charge each of flying capacitors 402 and 403 to a voltage $V_y/2$ or $V_{batt}/2(1-D)$ with a transient current o. During the charge transfer phase, as shown in the equivalent circuit 405 of FIG. 10B, charged flying capacitors 402 and 403 are connected in parallel and the parallel combination is electrically stacked atop the voltage $V_{batt}$ of the input voltage source 406, whereby a current o flows to charge output capacitor 407 to its final value $V_{OUT}$. Since the parallel combination of flying capacitors 402 and 403 and the voltage source 406 are series-connected, the voltage $V_{OUT}$ is sum of $V_{batt}$ and $V_y$:

$$V_{OUT} = V_{batt} + V_y$$
$$= V_{batt} + \frac{1}{2(1-D)}V_{batt}$$
$$= V_{batt}\left(1 + \frac{0.5}{1-D}\right)$$
$$= V_{batt}\left(\frac{1.5-D}{1-D}\right)$$

The equivalent output-to-input voltage transfer ratio of the embodiment of the LCUU converter disclosed herein is then given by $$\frac{V_{OUT}}{V_{batt}} = \left(1 + \frac{0.5}{(1-D)}\right) = \frac{1.5-D}{1-D}$$

The previously disclosed 1.5x-type LCUU converter 80 has a voltage transfer ratio of $V_{OUT}/V_{batt}=1.5/(1-D)$. In contrast, the LCUU version of converter 300 always operates above unity conversion but at a voltage less than 1.5× the value of $V_y$. Specifically, as D varies from zero to 75%, the transfer ratio of the LCUU version of converter 300 varies from 1.5× to 4×. Over the same range the previously disclosed 1.5×-type LCUU converter 80 would exhibit a range of 1.5× to 6×.

So even though the converter involves both only step-up stages, the transfer ratio range of the fractional type post-converter 80 shown in FIG. 4A is greater than the step-up range of the LCUU version of the high transient capable converter 300 shown in FIG. 8A. Nonetheless, the LCUU version of converter 300 still provides an extremely broad range of transfer ratios. Duty factors above 75% are also possible but then the currents needed to achieve the corresponding transfer ratios can be quite high.

If variable frequency control is employed, the duty factor D is replaced by the quantity $t_{on}/(t_{on}+t_{off})$, allowing either the magnetizing time of inductor 303 and the duration allowed for current recirculation, i.e. when the current inductor current declines, to be adjusted dynamically on a cycle by cycle basis.

Figure 10C:
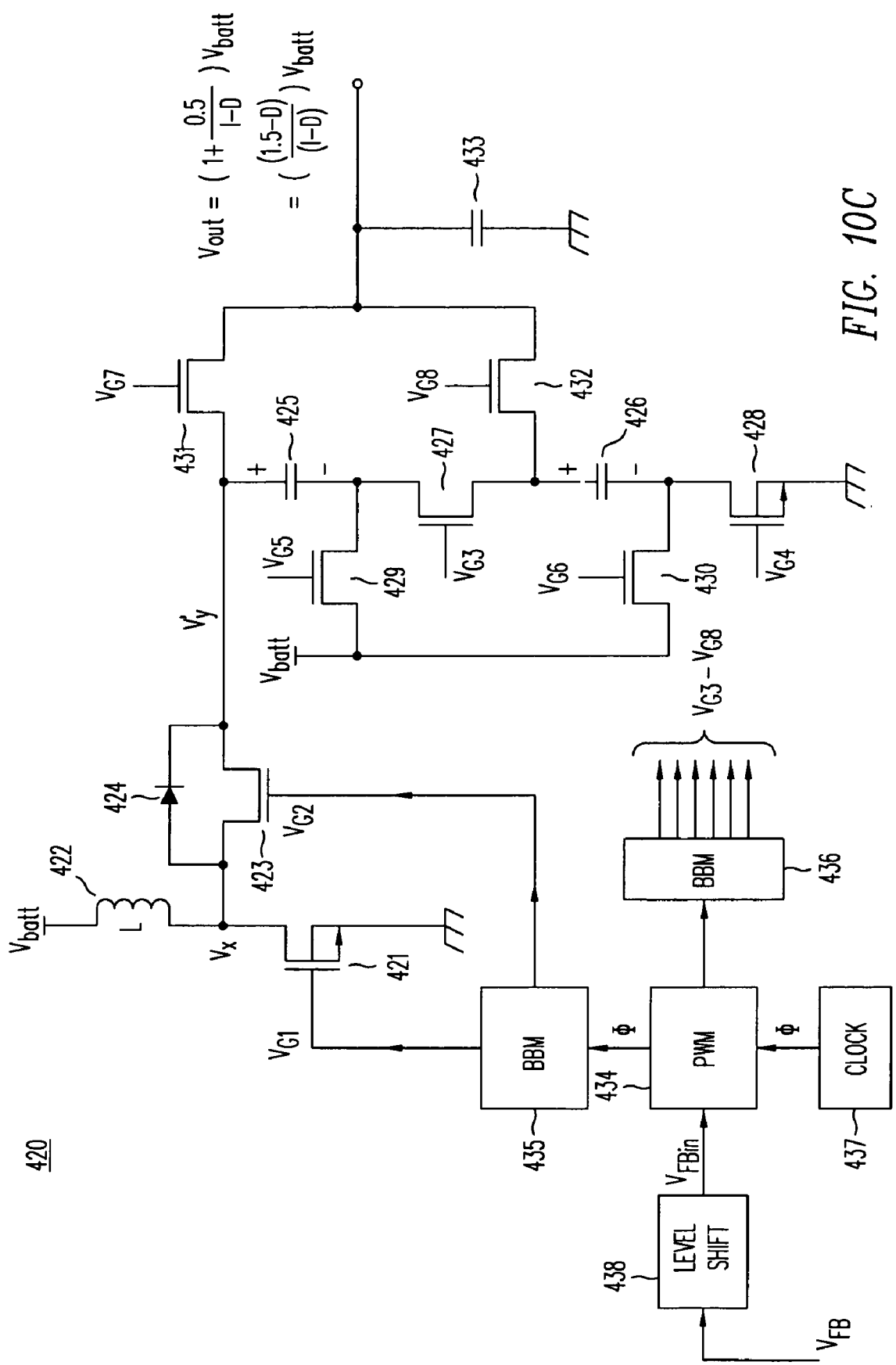
FIG. 10C is a circuit diagram of the LCUU converter with 1.5× post-converter.

An embodiment of the high-transient-capable fractional LCUU converter 420 is shown in FIG. 10C. Converter 420 includes a pre-regulator 420A comprising low-side N-channel MOSFET 421, floating synchronous rectifier MOSFET 423 with corresponding intrinsic P-N diode 424, inductor 422 and optional capacitor 445 and a post-converter 420B comprising flying capacitors 425 and 426, MOSFETs 425 through 432, and output capacitor 433. Synchronous rectifier MOSFET 423 may be P-channel or N-channel with appropriate changes in the gate drive circuitry and the polarity of the gate drive signal $V_{G2}$. MOSFET 423 serves a dual purpose in converter 420, both as a synchronous rectifier to the pre-regulator 420A and as one of the MOSFETs used to control the time when flying capacitors 425 and 426 are charged.

MOSFET gate drive and timing is achieved using pulse width modulation controller 434 with clock or ramp generator 437, and break-before-make (BBM) circuits 435 and 436. Pulse width modulation is achieved in response to a control voltage $V_{FB}$ using negative feedback from the output voltage $V_{OUT}$ of converter 420. Level shifter 438 adjusts the magnitude of $V_{FB}$ to the appropriate voltage to force $V_{OUT}$ to some targeted value. PWM controller 434 may alternatively operate using variable frequency control.

Operation of BBM circuit 435 insures that MOSFETs 421 and 423 are driven out of phase to avoid shoot-through conduction and shorting out of capacitors 425 and 426. Specifically, MOSFET 421 conducts to magnetize inductor 422, i.e. increase its current, while otherwise diode 424 and synchronous rectifier MOSFET 423 provide a current path to charge capacitors 425 and 426 whenever MOSFET 421 is off.

Similarly, BBM circuit 436 insures that MOSFET 423 conducts in phase with MOSFET's 427 and 428 and is driven out of phase with MOSFETs 429, 430, 431 and 432. Specifically, MOSFETs 423, 427 and 428 conduct to charge flying capacitors 425 and 426 from capacitor 445. Otherwise, MOSFETs 429 through 432 are biased to conduct simultaneously to transfer charge from flying capacitors 425 and 426 to output capacitor 453. In a preferred embodiment, BBM circuits 435 and 436 are driven in phase by a signal from a common clock generator 437.

In a preferred embodiment, inductor 422 is magnetized while flying capacitors 425 and 426 transfer their charge to output capacitor 453, requiring that MOSFETs 429, 430, 431 and 432 be driven in phase to conduct simultaneously. In the opposite phase, MOSFETs 423, 427 and 428 are biased to conduct simultaneously, thereby charging each of flying capacitors 425 and 426 to a voltage $V'_y/2$.

Since MOSFET 423 is used as both a synchronous rectifier and for charging the flying capacitors 425 and 426, no stable intermediate voltage $V_y$ exists in converter 420 as illustrated in circuit 300. Instead the voltage $V'_y$ acts like $V_y$ but only during the time that MOSFET 421 is off and MOSFETs 423, 427 and 428 are on. The size of optional capacitor 445 can be adjusted commensurate with the gate timing and the operating current range of the converter 420, but capacitor 445 may represent only the parasitic capacitance associated with the formation of the wells, i.e. the P-N junctions, used to form and integrate MOSFETs 424 through 433.

The embodiments described above are illustrative and not limiting. Many additional and alternative embodiments will be obvious to persons of skill in the art from the above description.

I claim:

1. A DC/DC voltage converter comprising:
   a pre-regulator comprising an inductive switching voltage converter, the pre-regulator having an input terminal and an output terminal; and
   a post-converter comprising a charge pump, the post-converter being powered through a first input terminal, the first input terminal being coupled to the output terminal of the pre-regulator, a second input terminal of the post-converter being coupled to the input terminal of the pre-regulator.

2. The DC/DC voltage converter of claim 1 wherein the charge pump comprises a capacitor, the first input terminal of the post-converter being coupled to a first terminal of the capacitor through a first switch, the second input terminal of the post-converter being coupled to a second terminal of the capacitor through a second switch.

3. The DC/DC voltage converter of claim 2 wherein the first terminal of the capacitor is coupled through a third switch to an output terminal of the converter, and the second terminal of the capacitor is coupled through a fourth switch to ground.

4. The DC/DC voltage converter of claim 3 wherein each of the first, second, third and fourth switches comprises a MOSFET.

5. The DC/DC voltage converter of claim 1 wherein the charge pump comprises at least two capacitors, the first input terminal of the post-converter being coupled to a first terminal of a first capacitor through a first switch, the second input terminal of the post-converter being coupled to a second terminal of the first capacitor through a second switch, the second terminal of the first capacitor being coupled to a first terminal of the second capacitor through a third switch, the second input terminal of the post-converter being coupled to a second terminal of the second capacitor through a fourth switch.

6. The DC/DC voltage converter of claim 5 wherein the first terminal of the first capacitor is coupled through a fifth switch to an output terminal of the converter, and the second terminal of the second capacitor is coupled through a sixth switch to ground.

7. The DC/DC voltage converter of claim 6 wherein the first terminal of the second capacitor is coupled through a seventh switch to the output terminal of the converter.

8. The DC/DC voltage converter of claim 7 wherein each of the first, second, third, fourth, fifth, sixth and seventh switches comprises a MOSFET.

9. The DC/DC voltage converter of claim 1 wherein the pre-regulator is adapted to step-up a voltage at the input terminal of the pre-regulator.

10. The DC/DC voltage converter of claim 9 wherein the post-converter is adapted to double a voltage at an input terminal of the post-converter.

11. The DC/DC voltage converter of claim 9 wherein the post-converter is adapted to multiply a voltage at an input terminal of the post-converter by a factor of 1.5.

12. The DC/DC voltage converter of claim 1 wherein the pre-regulator is adapted to step-down a voltage at the input terminal of the pre-regulator.

13. The DC/DC voltage converter of claim 12 wherein the post-converter is adapted to double a voltage at an input terminal of the post-converter.

14. The DC/DC voltage converter of claim 12 wherein the post-converter is adapted to multiply a voltage at an input terminal of the post-converter by a factor of 1.5.

15. A method of converting a DC input voltage to a DC output voltage comprising:
repeatedly switching a first terminal of an inductor between the DC input voltage and ground so as to produce an intermediate voltage;
using the intermediate voltage to charge at least one capacitor; and
repeatedly connecting a first terminal of the at least one capacitor to the DC input voltage and disconnecting the first terminal of the at least one capacitor from the DC input voltage, thereby producing the DC output voltage at a second terminal of the capacitor.

16. The method of claim 15 comprising:
providing an output capacitor; and
connecting the second terminal of the at least one capacitor to the output capacitor when the first terminal of the at least one capacitor is connected to the DC input voltage; and
disconnecting the second terminal of the at least one capacitor from the output capacitor when the first terminal of the at least one capacitor is disconnected from the DC input voltage.

17. The method of claim 16 wherein the first terminal of the inductor is connected to the DC input voltage while the intermediate voltage is used to charge the at least one capacitor.

18. The method of claim 16 comprising magnetizing the inductor while the intermediate voltage is used to charge the at least one capacitor.

19. The method of claim 16 wherein the first terminal of the inductor is connected to the DC input voltage while the second terminal of the at least one capacitor is connected to the output capacitor and the first terminal of the at least one capacitor is connected to the DC input voltage.

20. The method of claim 16 comprising magnetizing the inductor while the second terminal of the at least one capacitor is connected to the output capacitor and the first terminal of the at least one capacitor is connected to the DC input voltage.

21. A method of converting a DC input voltage to a DC output voltage comprising:
connecting a first terminal of an inductor to the DC input voltage;
repeatedly connecting a second terminal of the inductor to ground and disconnecting the second terminal of the inductor from ground so as to produce an intermediate voltage;
using the intermediate voltage to charge at least one capacitor; and
repeatedly connecting a first terminal of the at least one capacitor to the DC input voltage and disconnecting the first terminal of the at least one capacitor from the DC input voltage, thereby producing the DC output voltage at a second terminal of the capacitor.

22. The method of claim 21 comprising:
providing an output capacitor; and
connecting the second terminal of the at least one capacitor to the output capacitor when the first terminal of the at least one capacitor is connected to the DC input voltage; and
disconnecting the second terminal of the at least one capacitor from the output capacitor when the first terminal of the at least one capacitor is disconnected from the DC input voltage.

23. The method of claim 22 wherein the second terminal of the inductor is connected to ground while the intermediate voltage is used to charge the at least one capacitor.

24. The method of claim 22 comprising magnetizing the inductor while the intermediate voltage is used to charge the at least one capacitor.

25. The method of claim 22 wherein the second terminal of the inductor is connected to ground while the second terminal of the at least one capacitor is connected to the output capacitor and the first terminal of the at least one capacitor is connected to the DC input voltage.

26. The method of claim 22 comprising magnetizing the inductor while the second terminal of the at least one capacitor is connected to the output capacitor and the first terminal of the at least one capacitor is connected to the DC input voltage.

* * * * *